United States Patent
Gomez-Mower et al.

(10) Patent No.: US 12,297,140 B2
(45) Date of Patent: May 13, 2025

(54) SALT BATH SYSTEMS FOR STRENGTHENING GLASS ARTICLES AND METHODS FOR REGENERATING MOLTEN SALT

(71) Applicant: CORNING INCORPORATED, Corning, NY (US)

(72) Inventors: Sinue Gomez-Mower, Corning, NY (US); Kenneth Edward Hrdina, Horseheads, NY (US); Kai Tod Paul Jarosch, Corning, NY (US); Yuhui Jin, Painted Post, NY (US); Tyler John Lucci, Evanston, IL (US); Wei Sun, Painted Post, NY (US); Madison Kathleen Tindle, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 349 days.

(21) Appl. No.: 17/473,087

(22) Filed: Sep. 13, 2021

(65) Prior Publication Data

US 2022/0081357 A1    Mar. 17, 2022

Related U.S. Application Data

(60) Provisional application No. 63/078,488, filed on Sep. 15, 2020.

(51) Int. Cl.
C03C 21/00    (2006.01)
(52) U.S. Cl.
CPC .................. *C03C 21/002* (2013.01)

(58) Field of Classification Search
None
See application file for complete search history.

(56) References Cited

U.S. PATENT DOCUMENTS

| 2,888,495 A | 5/1959 | Kissling |
| 3,336,731 A | 8/1967 | Phillips et al. |

(Continued)

FOREIGN PATENT DOCUMENTS

| AU | 2013211472 B2 | 3/2016 |
| CN | 104310444 A | 1/2015 |

(Continued)

OTHER PUBLICATIONS

PE2E translation of CN 104310444 (Year: 2015).*

(Continued)

*Primary Examiner* — Jodi C Franklin
(74) *Attorney, Agent, or Firm* — Chandra J. Duncan

(57) ABSTRACT

Embodiments of the present disclosure are directed to salt bath systems for strengthening glass articles including a salt bath tank defining a first interior volume enclosed by at least one sidewall; a salt bath composition including an alkali metal salt positioned within the first interior volume; a containment device defining a second interior volume enclosed by at least one sidewall and including a regeneration medium positioned within the second interior volume; and a circulation device positioned proximate to an inlet of the containment device, wherein the circulation device is operable to circulate the salt bath composition through the containment device. Methods for regenerating a molten salt are also disclosed.

11 Claims, 9 Drawing Sheets

(56) References Cited

U.S. PATENT DOCUMENTS

| | | | |
|---|---|---|---|
| 3,385,759 A | 5/1968 | Bettis et al. | |
| 3,395,999 A | 8/1968 | Lewek | |
| 3,441,398 A | 4/1969 | Hess | |
| 3,711,393 A | 1/1973 | Garfinkel | |
| 3,730,871 A | 5/1973 | Boffe | |
| 3,879,274 A | 4/1975 | Matsumori et al. | |
| 3,933,127 A | 1/1976 | Arps | |
| 4,689,146 A | 8/1987 | Kasai et al. | |
| 5,015,288 A | 5/1991 | Kusik et al. | |
| 5,846,278 A | 12/1998 | Jantzen et al. | |
| 6,190,548 B1 | 2/2001 | Frick | |
| 6,534,120 B1* | 3/2003 | Ozawa | G11B 5/8404 427/127 |
| 7,419,530 B2 | 9/2008 | De Vries et al. | |
| 8,551,898 B2 | 10/2013 | Danielson et al. | |
| 8,834,806 B2 | 9/2014 | Mizrahi | |
| 8,956,424 B2 | 2/2015 | Yang | |
| 8,980,777 B2 | 3/2015 | Danielson et al. | |
| 10,202,300 B2 | 2/2019 | Hart et al. | |
| 10,556,826 B2 | 2/2020 | Amin et al. | |
| 2005/0181931 A1 | 8/2005 | Mouri et al. | |
| 2005/0284179 A1 | 12/2005 | Isono et al. | |
| 2009/0241731 A1 | 10/2009 | Pereira et al. | |
| 2011/0293942 A1* | 12/2011 | Cornejo | C03C 3/083 65/355 |
| 2012/0196110 A1 | 8/2012 | Murata et al. | |
| 2012/0210749 A1 | 8/2012 | Feng et al. | |
| 2013/0061636 A1 | 3/2013 | Imai et al. | |
| 2013/0122254 A1* | 5/2013 | Liang | C03C 21/002 428/210 |
| 2013/0202715 A1 | 8/2013 | Wang et al. | |
| 2013/0219965 A1 | 8/2013 | Allan et al. | |
| 2014/0366579 A1* | 12/2014 | Antoine | C03C 21/002 65/157 |
| 2015/0152344 A1 | 6/2015 | Gueh | |
| 2016/0039587 A1* | 2/2016 | Wetherill | B25B 11/00 269/40 |
| 2016/0200629 A1 | 7/2016 | Ikawa et al. | |
| 2017/0197869 A1 | 7/2017 | Beall et al. | |
| 2017/0282503 A1 | 10/2017 | Peng et al. | |
| 2017/0295657 A1 | 10/2017 | Gross et al. | |
| 2017/0305788 A1 | 10/2017 | Nikulin | |
| 2018/0057402 A1 | 3/2018 | Hu et al. | |
| 2018/0148373 A1 | 5/2018 | Harris et al. | |
| 2018/0327305 A1* | 11/2018 | Amin | C03C 21/002 |
| 2018/0362399 A1 | 12/2018 | Amin et al. | |
| 2019/0062207 A1 | 2/2019 | Jin | |
| 2019/0127265 A1 | 5/2019 | Dejneka et al. | |
| 2020/0102244 A1 | 4/2020 | Li et al. | |
| 2020/0171478 A1 | 6/2020 | Bernard et al. | |
| 2020/0172434 A1 | 6/2020 | Dafin et al. | |
| 2021/0198141 A1 | 7/2021 | Lee | |
| 2021/0300817 A1 | 9/2021 | Kobayashi et al. | |
| 2023/0312410 A1 | 10/2023 | Voland et al. | |

FOREIGN PATENT DOCUMENTS

| | | |
|---|---|---|
| CN | 104445293 A | 3/2015 |
| CN | 105555730 A | 5/2016 |
| CN | 105593177 A | 5/2016 |
| CN | 106629785 A | 5/2017 |
| CN | 107108305 A | 8/2017 |
| CN | 107207315 A | 9/2017 |
| CN | 107311205 A | 11/2017 |
| CN | 108975667 A * | 12/2018 |
| CN | 110342834 A | 10/2019 |
| CN | 209612365 U | 11/2019 |
| JP | 2015-151315 A | 8/2015 |
| JP | 6273816 B2 | 2/2018 |
| WO | 2014/045977 A1 | 3/2014 |
| WO | 2014/045979 A1 | 3/2014 |
| WO | 2015/080095 A1 | 6/2015 |

OTHER PUBLICATIONS

International Search Report and Written Opinion of the International Searching Authority; PCT/US2021/048982; dated May 26, 2023; 8 pages; European Patent Office.

Araujo et al; "Ion Exchange Equilibria Between Glass and Molten Salts"; Journal of Non-Crystalline Solids; 318; pp. 262-267 (2003).

Arthur "An investigation into the thermophysical and rheological properties of nanofluids for solar thermal applications" Renewable and Sustainable Energy Reviews 55 (2016) 739-755.

Bartholomew "A Study of the Equilibrium $KNO_3(I) \Leftrightarrow KNO_2(I) + 1/2 O_2$ (g) Over the Temperature Range 550-750°" J. Phys. Chem. (1966) 3442-3446.

Freeman "The Kinetics of the Thermal Decomposition of Sodium Nitrate and of the Reaction Between Sodium Nitrite and Oxygen" J. Phys. Chem. 60(11) 1487-1493, 1956.

Freeman "The Kinetics of Thermal Decomposition of Potassium Nitrate and of the Reaction Between Potassium Nitrate and Oxygen" J. Am. Chem. Soc. (Feb. 20, 1957) 838-842.

Kramer "Differential Scanning Calorimetry of Sodium and Potassium Nitrates and Nitrites" Thermochimica Acta 55 (1982) 11-17.

Lindauer et al, "Design Construction and Testing of a Large Molten Salt Filter", Oak Ridge National Laboratory (1969).

McCabe et al., "Unit Operations in Chemical Engineering" Fourth Edition 1985 pp. 749-758.

Xiao-Fu et al., "Separation of sodium and potassium using adsorption—elution/crystallization scheme from bittern", Chemical Engineering Research and Design, vol. 161, 2020, pp. 72-81.

"302 Stainless Steel AMS 5516/UNS S30200", Retrieved from: https://www.upmet.com/sites/default/files/datasheets/302.pdf, 3 pages, 2000.

"8" Nom. Schedule 10 Stainless Pipe 304/304L Welded, Retrieved from: https://www.onlinemetals.com/en/buy/stainless-steel/8-nom-schedule-10-stainless-pipe-304-304l-welded/pid/939, OnlineMetals.com, 2024, 6 pages.

"8" Seamless Pipe Schedule 10s, Stainless Steel 304/304L ASTM A312 ASME SA312, Retrieved from: https://pipingnow.com/8-Seamless-pipe-schedule-10s-stainless-steel-304-304l-astm-a312-asme-sa312/, 2024, 6 pages.

"Stainless Steel—Grade 302 (UNS S30200)", Retrieved from: https://www.azom.com/article.aspx?ArticleID=8197, 2024, 6 pages.

"Understanding stainless-steel grades", Retrieved from: https://www.essentracomponents.com/en-us/news/solutions/access-hardware/understanding-stainless-steel-grades, 2024, 4 pages.

* cited by examiner

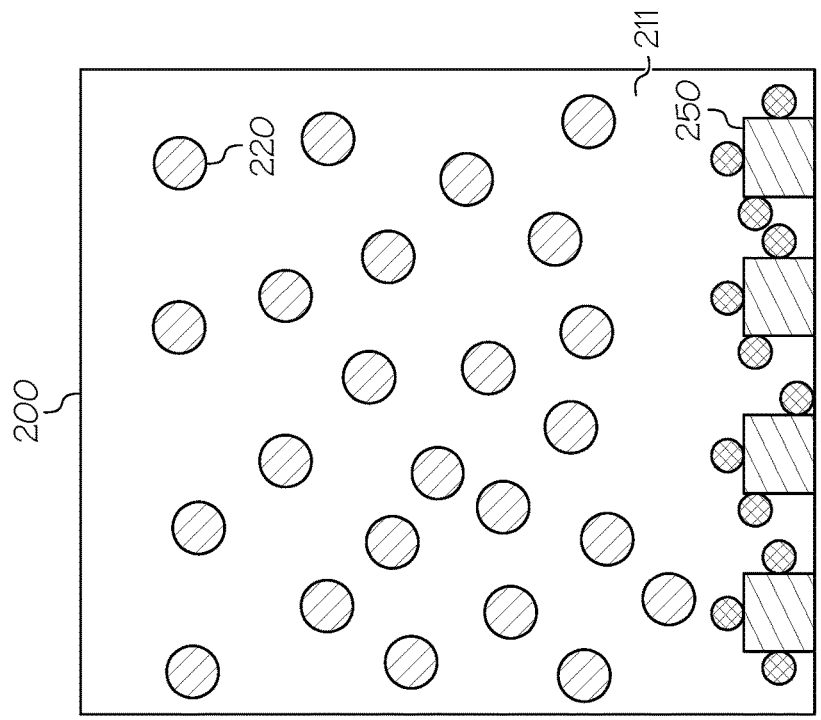
FIG. 2B [Prior Art]
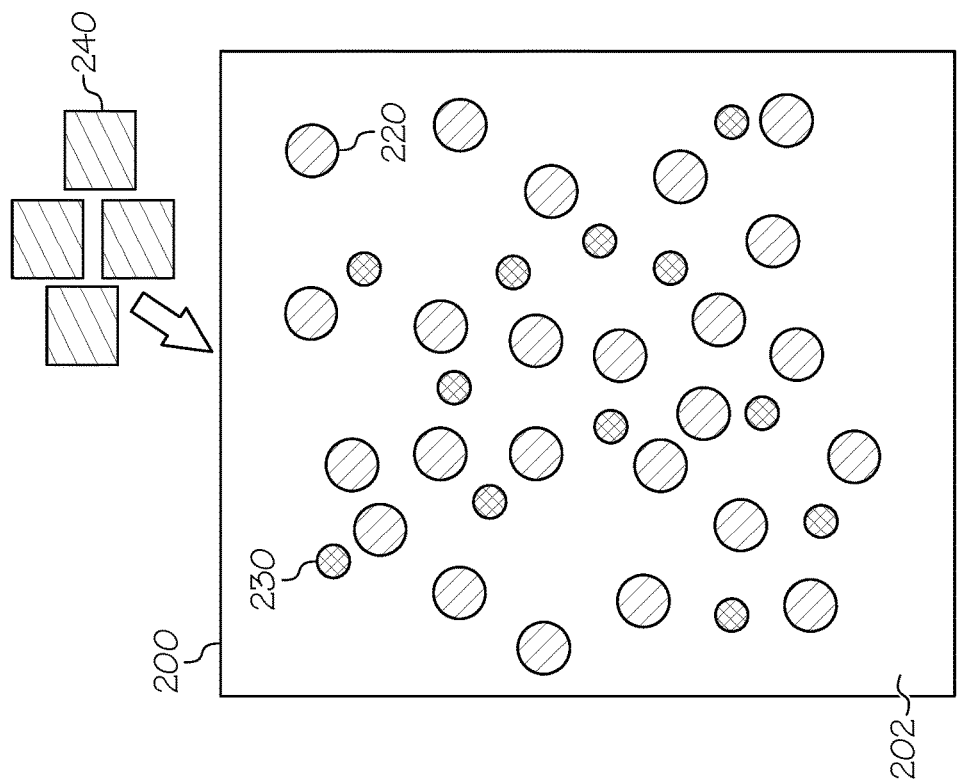
FIG. 2A [Prior Art]

SALT BATH SYSTEMS FOR STRENGTHENING GLASS ARTICLES AND METHODS FOR REGENERATING MOLTEN SALT

CROSS-REFERENCE TO RELATED APPLICATIONS

This application claims the benefit of priority under 35 U.S.C. § 119 of U.S. Provisional Application Ser. No. 63/078,488 filed on Sep. 15, 2020, the content of which is relied upon and incorporated herein by reference in its entirety.

BACKGROUND

Field

The present disclosure relates to systems and methods for chemically strengthening glass articles and, in particular, salt bath systems for strengthening glass articles and methods for regenerating molten salt.

Technical Background

Tempered or strengthened glass may be used in a variety of applications. For example, strengthened glass articles may be used in consumer electronic devices, such as smart phones and tablets, and pharmaceutical packaging because of its physical durability and resistance to breakage. Conventional strengthening processes, such as conventional ion exchange processes, often immerse multiple glass articles in a single salt bath in batches to increase the efficiency of the strengthening process. However, as the batchwise production of strengthened glass articles continues in the same salt bath, the ion exchange process will naturally result in a decrease in the efficacy of the salt bath. While a number of methods for reducing and/or preventing decreases in the efficacy of the salt bath may be employed, these methods may also introduce various complications to the ion exchange process.

Accordingly, a need exists for alternative salt bath systems for strengthening glass articles as well as alternative methods for regenerating molten salt.

SUMMARY

According to a first aspect of the present disclosure, a salt bath system for strengthening glass articles may include a salt bath tank defining a first interior volume enclosed by at least one sidewall; a salt bath composition including an alkali metal salt positioned within the first interior volume; a containment device positioned within the first interior volume, wherein the containment device defines a second interior volume enclosed by at least one sidewall and includes a regeneration medium positioned within the second interior volume; and a circulation device positioned proximate to an inlet of the containment device, wherein the circulation device is operable to circulate the salt bath composition through the containment device.

According to a second aspect of the present disclosure, a salt bath system for strengthening glass articles may include a salt bath tank defining a first interior volume enclosed by at least one sidewall; a salt bath composition including an alkali metal salt positioned within the first interior volume; a containment device positioned outside of the first interior volume and fluidly coupled to the first interior volume, wherein the containment device defines a second interior volume enclosed by at least one sidewall and includes a regeneration medium positioned within the second interior volume; and a circulation device positioned within the first interior volume and proximate to an inlet of the containment device, wherein the circulation device is operable to circulate the molten salt bath through the containment device.

A third aspect of the present disclosure may include the second aspect, wherein a temperature of the second interior volume is greater than or equal to 3° C. less than a temperature of the first interior volume.

A fourth aspect of the present disclosure may include any of the first through third aspects, wherein the regeneration medium includes silicic acid aggregates, an alkali metal phosphate salt, a porous metal oxide, or combinations thereof.

A fifth aspect of the present disclosure may include any of the first through fourth aspects, wherein the average particle size of the regeneration medium is from 5 μm to 5,000 μm.

A sixth aspect of the present disclosure may include any of the first through fifth aspects, wherein greater than or equal to 90% of the regeneration medium have a particle size greater than 5 μm.

A seventh aspect of the present disclosure may include any of the first through sixth aspects, wherein the regeneration medium includes grains, rings, saddles, spheres, engineered monoliths, honeycombs, fibers, felts, active layers coated on or impregnated in an inert carrier, or combinations of these.

An eighth aspect of the present disclosure may include any of the first through seventh aspects, wherein the salt bath composition positioned within the first interior volume is substantially free of the regeneration material.

A ninth aspect of the present disclosure may include any of the first through eighth aspects, wherein the circulation device includes an impeller, a pump, a gas injection system, or combinations thereof.

A tenth aspect of the present disclosure may include any of the first through ninth aspects, wherein the circulation device is operable to circulate the salt bath composition through the containment device at a rate of from 0.001 vol/hr to 10 vol/hr.

An eleventh aspect of the present disclosure may include any of the first through tenth aspects, wherein the inlet of the containment device is enclosed by a sieve comprising openings having effective diameters less than or equal to 15% of an average particle size of the regeneration media; an outlet of the containment device is enclosed by a sieve comprising openings having effective diameters less than or equal to 15% of the average particle size of the regeneration media; or both inlet of the containment device and the outlet of the containment device are enclosed by sieves comprising openings having effective diameters less than or equal to 15% of the average particle size of the regeneration media.

A twelfth aspect of the present disclosure may include any of the first through eleventh aspects, wherein the second interior volume comprises a first regeneration zone and a second regeneration zone positioned downstream of the first regeneration zone.

A thirteenth aspect of the present disclosure may include the twelfth aspect, wherein the first regeneration zone comprises a first regeneration medium; and the second regeneration zone comprises a second regeneration medium different than the first regeneration medium.

A fourteenth aspect of the present disclosure may include the thirteenth aspect, wherein the containment device includes a sieve positioned between the first regeneration zone and the second regeneration zone, wherein the sieve includes openings having diameters less than the average particle size of at least one of the first regeneration medium and the second regeneration medium.

According to a fifteenth aspect of the present disclosure, method for regenerating a molten salt may include circulating the molten salt through a containment device positioned within a first interior volume of a salt bath tank, the molten salt including one or more impurities formed during an ion exchange process, and the containment device including a regeneration medium positioned within a second interior volume defined by the containment device; and contacting the molten salt with the regeneration medium within the containment device, wherein the contact reduces a concentration of the one or more impurities in the molten salt.

According to a sixteenth aspect of the present disclosure, method for regenerating a molten salt may include circulating the molten salt through a containment device positioned outside of a first interior volume defined by a salt bath tank, the molten salt including one or more impurities formed during an ion exchange process, and the containment device including a regeneration medium positioned within a second interior volume defined by the containment device; and contacting the molten salt with the regeneration medium within the containment device, wherein the contact reduces a concentration of the one or more impurities in the molten salt.

A seventeenth aspect of the present disclosure may include the sixteenth aspect, wherein a temperature of the second interior volume is greater than or equal to 3° C. less than a temperature of the first interior volume.

An eighteenth aspect of the present disclosure may include any of the fifteenth through seventeenth aspects, wherein the one or more impurities comprises lithium nitrate, an alkali metal nitrite, an alkali metal oxide, an alkaline earth metal nitrite, an alkaline earth metal oxide, or combinations of these.

A nineteenth aspect of the present disclosure may include any of the fifteenth through eighteenth aspects, wherein the regeneration medium comprises silicic acid, an alkali metal phosphate salt, an alkali metal carbonate a porous metal oxide, or combinations of these.

A twentieth aspect of the present disclosure may include any of the fifteenth through nineteenth aspects, wherein the average particle size of the regeneration medium is be from 5 µm to 5,000 µm.

A twenty-first aspect of the present disclosure may include any of the fifteenth through twentieth aspects, wherein greater than or equal to 90% of the regeneration medium have a particle size greater than 5 µm.

A twenty-second aspect of the present disclosure may include any of the fifteenth through twenty-first aspects, wherein the regeneration medium comprises grains, rings, saddles, spheres, engineered monoliths, honeycombs, fibers, felts, active layers coated on or impregnated in an inert carrier, or combinations of these.

A twenty-third aspect of the present disclosure may include any of the fifteenth through twenty-second aspects, wherein the salt bath composition positioned within the first interior volume is substantially free of the regeneration material.

A twenty-fourth aspect of the present disclosure may include any of the fifteenth through twenty-third aspects, wherein the molten salt is circulated through the containment device at a rate of from 0.001 vol/hr to 10 vol/hr.

A twenty-fifth aspect of the present disclosure may include any of the fifteenth through twenty-fourth aspects, further including heating a salt bath composition comprising an alkali metal salt to an ion exchange temperature to form the molten salt; and submerging a glass article into the molten salt such that an ion exchange between the molten salt and the glass article occurs, wherein the ion exchange between the molten salt and the glass article forms the one or more impurities in the molten salt.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The following detailed description of the present disclosure may be better understood when read in conjunction with the following drawings in which:

FIG. 2A schematically depicts a portion of an ion exchange process, according to one or more embodiments shown and described herein;

FIG. 2B schematically depicts a portion of an ion exchange process, according to one or more embodiments shown and described herein;

Figure 4A:
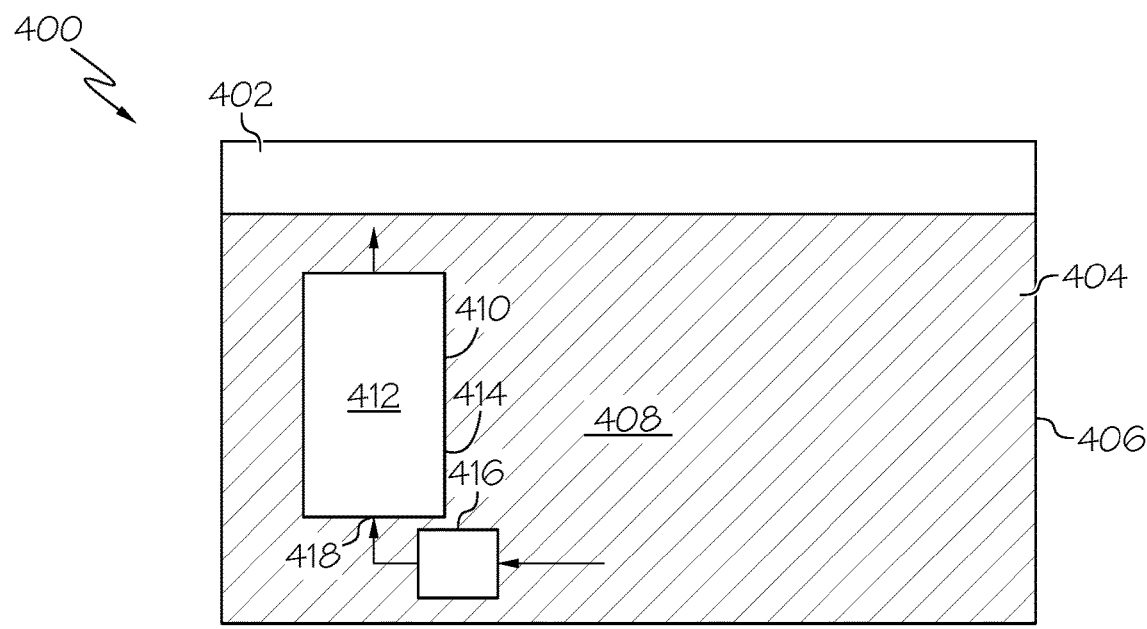
FIG. 4A schematically depicts a generalized flow diagram of a salt bath system for strengthening glass articles, according to one or more embodiments shown and described herein.
Figure 4B:
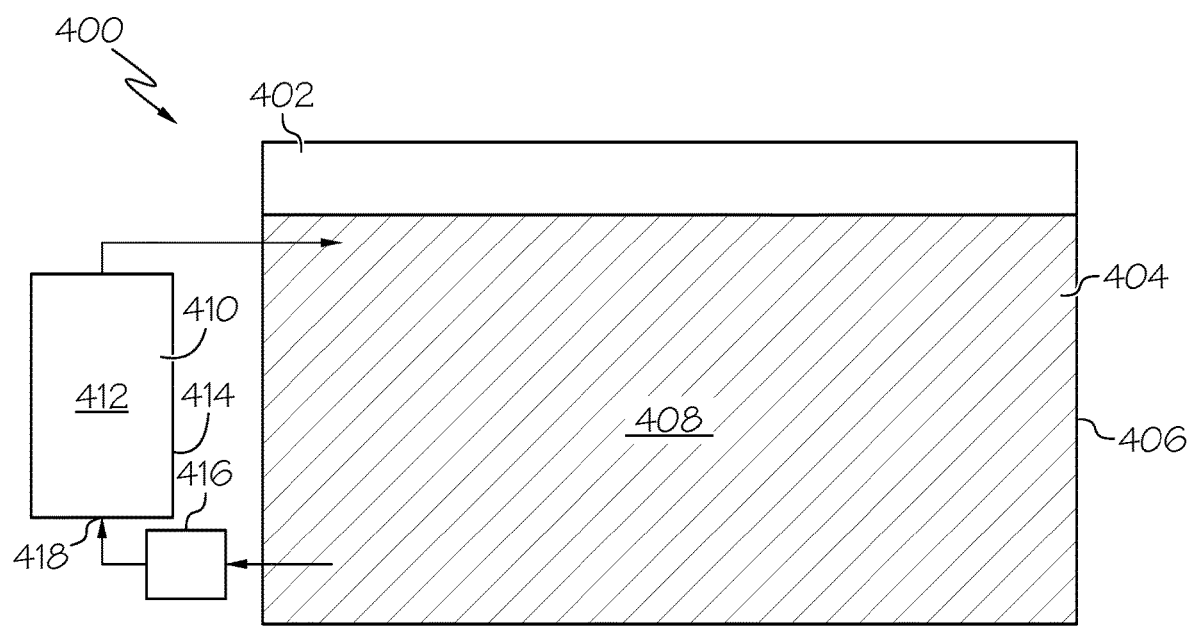
FIG. 4B schematically depicts a generalized flow diagram of a salt bath system for strengthening glass articles, according to one or more embodiments shown and described herein.
Figure 4C:
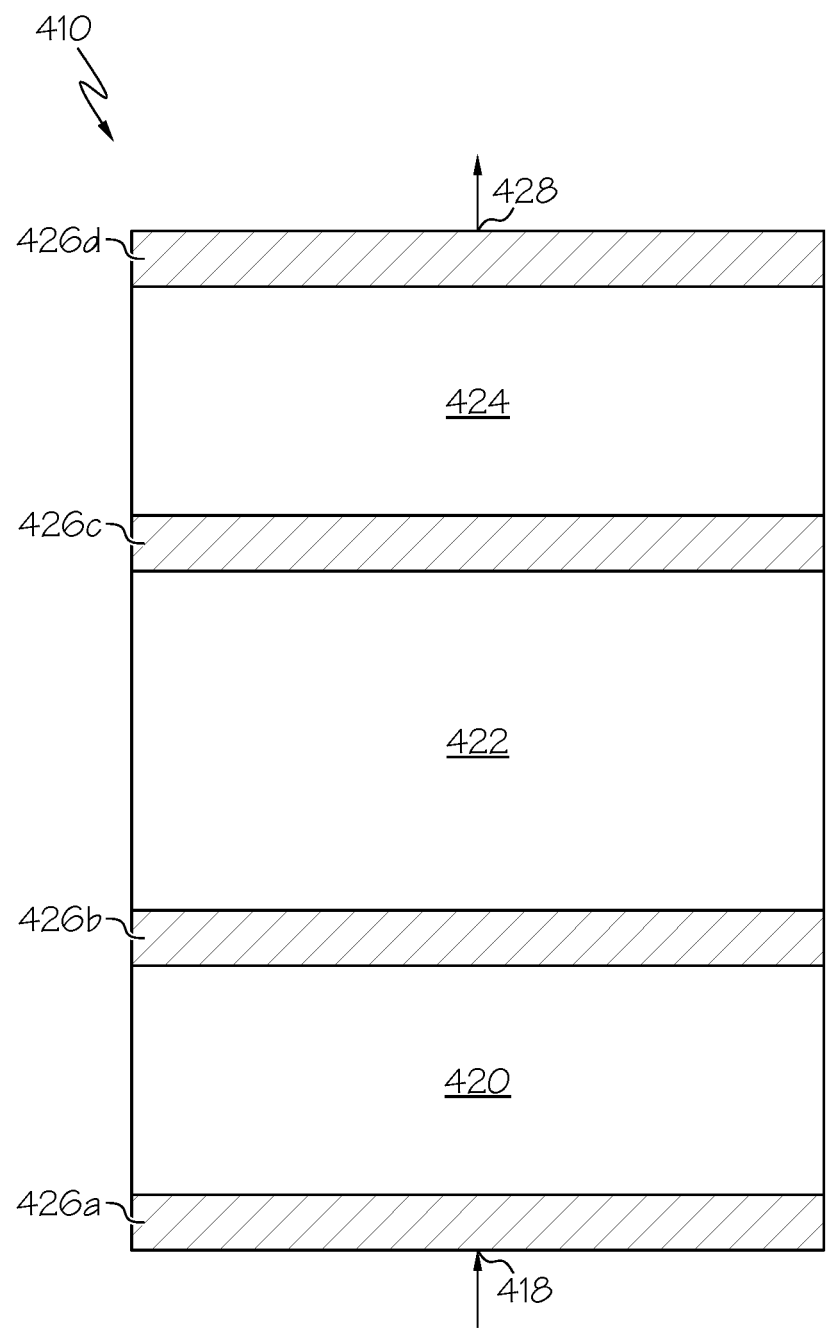
FIG. 4C schematically depicts a containment device of the salt bath systems for strengthening glass articles depicted in FIGS. 4B and 4C, according to one or more embodiments shown and described herein.

When describing the simplified schematic illustration of FIGS. 4A-4C, the numerous valves, temperature sensors, electronic controllers, and the like, which may be used and are well known to a person of ordinary skill in the art, are not included. However, a person of ordinary skill in the art understands that these components are within the scope of the present disclosure.

Additionally, the arrows in the simplified schematic illustration of FIGS. 4A-4C refer to the transfer or flow of materials. However, the arrows may equivalently refer to transfer lines, such as conduits or the like, which may transfer such materials between two or more system components. Arrows that connect to one or more system components signify inlets or outlets in the given system components and arrows that connect to only one system component signify a system outlet that exits the depicted system or a system inlet that enters the depicted system. The arrow direction generally corresponds with the major direction of movement of the materials or the materials contained within the physical transfer line signified by the arrow.

The arrows in the simplified schematic illustration of FIGS. 4A-4C may also refer to process steps of transporting materials from one system component to another system component. For example, an arrow from a first system component pointing to a second system component may signify "passing" materials from the first system component to the second system component, which may comprise the materials "exiting" or being "removed" from the first system component and "introducing" the materials to the second system component.

Reference will now be made in greater detail to various embodiments of the present disclosure, some of which are illustrated in the accompanying drawings.

DETAILED DESCRIPTION

Embodiments described herein are directed to salt bath systems for strengthening glass articles and methods for regenerating molten salt. Salt bath systems for strengthening glass articles according to the present disclosure may generally comprise a salt bath tank defining a first interior volume enclosed by at least one sidewall, a salt bath composition positioned within the first interior volume, a containment device positioned within the first interior volume, and a circulation device positioned proximate to an inlet of the containment device. The salt bath composition may comprise an alkali metal salt. The containment device may define a second interior volume enclosed by at least one sidewall and may comprise a regeneration medium positioned within the second interior volume. The circulation device may be operable to circulate the salt bath composition through the containment device. Methods for regenerating molten salt according to the present disclosure may generally comprise circulating the molten salt through a containment device positioned within a first interior volume of a salt bath tank, and contacting the molten salt with the regeneration medium within the containment device. The molten salt may comprise one or more impurities formed during an ion exchange process. The containment device may comprise a regeneration medium positioned within a second interior volume defined by the containment device. The contact may reduce a concentration of the one or more impurities in the molten salt. Various embodiments of the systems and methods of the present disclosure will be described herein with specific reference to the appended drawings.

Directional terms as used herein—for example up, down, right, left, front, back, top, bottom—are made only with reference to the figures as drawn and are not intended to imply ab solute orientation.

As used herein, the indefinite articles "a" and "an," when referring to elements of the present disclosure, mean that least one of these elements are present. Although these indefinite articles are conventionally employed to signify that the modified noun is a singular noun, the indefinite articles "a" and "an" also include the plural in the present disclosure, unless stated otherwise. Similarly, the definite article "the" also signifies that the modified noun may be singular or plural in the present disclosure, unless stated otherwise.

As used herein, the term "or" is inclusive and, in particular, the term "A or B" refers to "A, B, or both A and B." Alternatively, the term "or" may be used in the exclusive sense only when explicitly designated in the present disclosure, such as by the terms "either A or B" or "one of A or B."

As used herein, the terms "salt bath composition," "salt bath," "molten salt," etc., are, unless otherwise specified, equivalent terms, and refer to the solution or medium used to effect the ion exchange process with a glass (or glass-ceramic) article, in which cations within the surface of a glass article are replaced or exchanged with cations that are present in the salt bath. It is understood that a salt bath may include at least one alkali metal salt, such as potassium nitrate ($KNO_3$) and/or sodium nitrate ($NaNO_3$), which may be liquefied by heat or otherwise heated to a substantially liquid phase.

As used herein, the term "chemical durability" refers to the ability of the glass composition to resist degradation upon exposure to specified chemical conditions. Specifically, the chemical durability of the glass articles described herein was assessed in water according to the "Surface Glass Test" of USP <660>"Containers—Glass" (2017).

It should be understood that a flow of materials may be named for the components within the flow of materials, and the component for which the flow of materials is named may be the major component of the flow of materials (such as comprising from 50 wt. %, from 70 wt. %, from 90 wt. %, from 95 wt. %, from 99 wt. %, from 99.5 wt. %, or from 99.9 wt. % of the flow of materials to 100 wt. % of the flow of materials). For example, a flow of a salt bath composition, which may be from a salt bath tank to a containment device, may comprise from 50 wt. % to 100 wt. % of the salt bath composition and, as a result, the flow of materials may also be named the "salt bath composition." It should also be understood that components are disclosed as passing from one system component to another when a flow of materials comprising that component is disclosed as passing from that system component to another. For example, a disclosed flow of a salt bath composition from a first system component to a second system component should be understood to equivalently disclose the salt bath composition passing from the first system component to the second system component.

Unless otherwise expressly stated, it is in no way intended that any method set forth herein be construed as requiring that its steps be performed in a specific order, nor that with any apparatus specific orientations are required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Figure 1B:
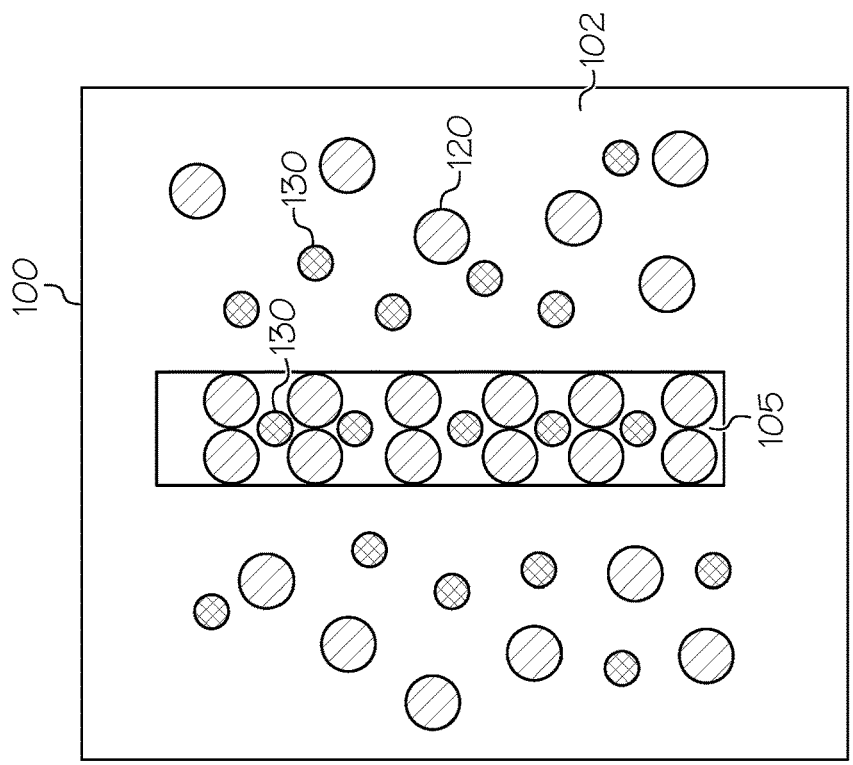
FIG. 1B schematically depicts a portion of an ion exchange process, according to one or more embodiments shown and described herein.
Figure 1A:
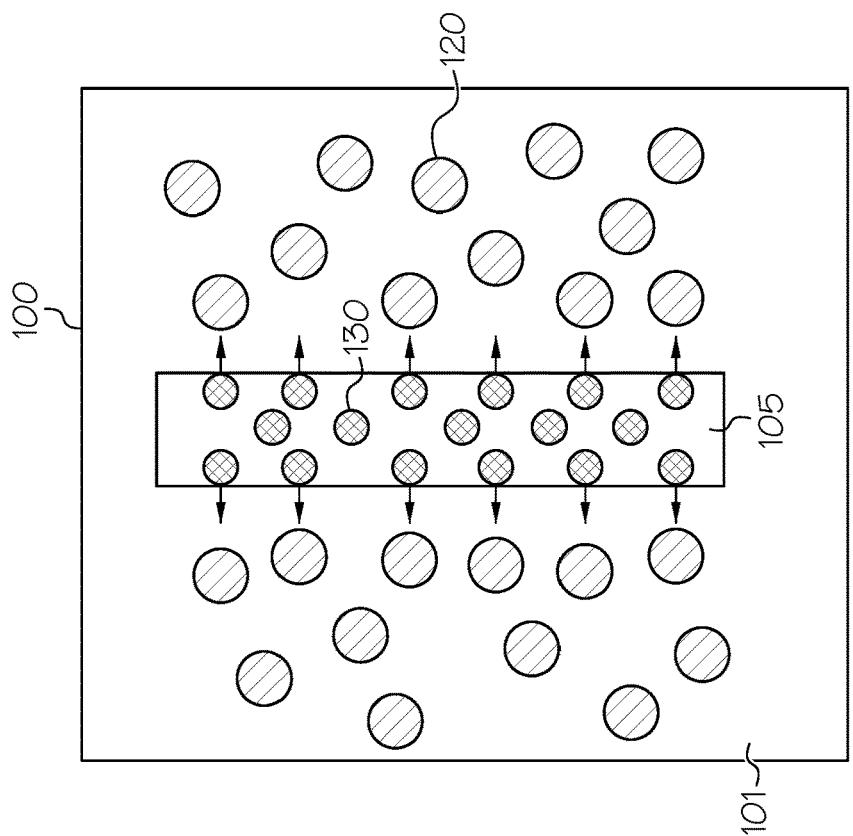
FIG. 1A schematically depicts a portion of an ion exchange process, according to one or more embodiments shown and described herein.

Referring initially to FIGS. 1A and 1B, a conventional ion exchange process is schematically depicted. The ion exchange process includes immersing a glass article 105 in a salt bath 100. The glass article 105 may contain relatively smaller cations 130, for example, alkali metal cations such as $Li^+$ and/or $Na^+$ cations. The salt bath 100 may include a molten salt 101 containing relatively larger cations 120 (i.e., relative to the cations 130 of the glass article). That is, the cations 120 may have an atomic radius larger than an atomic radius of the cations 130. The cations 120 may include, for example, alkali metal cations, such as potassium ($K^+$) cations. The larger cations 120 may have disassociated from a salt, such as an alkali metal nitrate, present in the salt bath 100 when heated to an elevated temperature to produce the molten salt 101. When the glass article 105 is immersed in the salt bath 100, the cations 130 within the glass article 105 may diffuse from the glass article 105 and into the molten salt 101. Referring now to FIG. 1B, the cations 120 from the molten salt 101 may replace the cations 130 in the glass article 105 after such diffusion. This substitution of larger cations from the molten salt 101 for smaller cations in the glass article 105 creates a surface compressive stress (CS) at the surface of the glass article 105 that extends to a depth of compression (DOC), which may increase the mechanical strength of the glass article 105 and improve the resistance of the glass article 105 to breakage.

Generally, multiple glass articles may be immersed in a single salt bath in batches in order to increase the efficiency of the ion exchange process. However, as the batchwise production of strengthened glass articles continues in the same salt bath, the ion exchange process will naturally result in a decrease in the efficacy of the salt bath. One reason for this decrease in the efficacy of the salt bath may be due to the formation of undesirable species within the molten salt. In particular, during an ion exchange process, alkali metal nitrates present in the salt bath may decompose into alkali metal nitrites and/or alkali metal oxides in the molten salt. For example, the decomposition of an alkali metal nitrate into an alkali metal nitrite is indicated in the following equation:

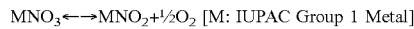
$$MNO_3 \leftrightarrow MNO_2 + \tfrac{1}{2}O_2 \text{ [M: IUPAC Group 1 Metal]}$$

Both alkali metal nitrates and alkali metal nitrites may further decompose into alkali metal oxides, as indicated in the following equation:

$$MNO_2 \leftrightarrow M_2O + NO_x \text{ [M: IUPAC Group 1 Metal]}$$

For example, in instances where potassium nitrate ($KNO_3$) is present in the salt bath, the $KNO_3$ decomposes into two primary decomposition products at temperatures greater than about 400° C.: potassium nitrite ($KNO_2$) and potassium oxide ($K_2O$). Other alkali metal nitrates, such as sodium nitrate and lithium nitrate, may decompose into the corresponding alkali metal nitrites and alkali metal oxides at temperatures even lower than $KNO_3$ (i.e., temperatures less than or equal to 400° C.

The presence of alkali metal oxides, such as $K_2O$, in the molten salt may degrade the properties of the glass articles treated therein. In particular, alkali metal oxides in the molten salt may incongruently etch the surface of glass articles during ion exchange. This etching may degrade the surface of the glass article, which may, in turn, adversely impact a number of properties of the glass article. For example, glass articles that undergo ion exchange in molten salt that includes concentrations of $K_2O$ greater than or equal to 0.5 wt. % may form visible etching and surface damage on the glass articles. Even when glass articles undergo ion exchange in molten salt that includes concentrations of $K_2O$ significantly less than 0.5 wt. % (i.e., 0.05 wt. % or even 0.005 wt. %), the presence of $K_2O$ may result in a substantial decrease in the mechanical strength of the glass articles.

The degradation of the surface of glass articles during ion exchange may be reduced or prevented by the neutralization of the salt bath. That is, the degradation of the surface of glass articles during ion exchange may be reduced or prevented by a reduction or elimination of the alkali metal oxides present within the salt bath. This may be achieved, at least in part, by the inclusion of a regeneration medium, such as silicic acid, within the salt bath. As used herein, the term "silicic acid" may refer to silicic acids, such as orthosilicic acid ($Si(OH)_4$), as well as the corresponding silicates, which are the conjugate bases of silicic acids. Silicic acids generally react with alkali metal oxides to form an unreactive product, as indicated in the following equation:

$$M_2O + SiO_2 \rightarrow M_2SiO_3 \text{ [M: IUPAC Group 1 Metal]}$$

Silicic acid may also react with common contaminants in the molten salt, such as calcium cations ($Ca^{2+}$) and magnesium cations ($Mg^{2+}$), which can attach to the surfaces of glass articles and retard ion exchange processes.

Another reason for this decrease in efficacy of the salt bath may be due to the "poisoning" of the molten salt with undesirable cations initially present in the glass articles. For example, while lithium-containing glass articles may provide a number of benefits, such as a quicker and more efficient ion exchange process, as few as 1 wt. % of lithium cations in the molten salt bath (i.e., lithium cations exchanged out of the glass article and into the slat bath during ion exchange) may reduce the surface compressive stress and depth of compression achievable in the glass articles. Even when the concentration of lithium cations in the molten salt is less than 1 wt. %, lithium cations may retard the ion exchange process and, as the concentration of lithium cations in the molten salt naturally increases during the ion exchange process, results in strengthened glass articles with drastically different compressive stresses and depths of compression from batch to batch.

Salt baths that have been poisoned with undesirable cations, such as lithium cations, may be regenerated by the addition of a regeneration medium, such as a phosphate salt. For example, referring now to FIGS. 2A and 2B, a salt bath 200 containing a poisoned molten salt 202 is depicted. The poisoned molten salt 202 contains lithium cations 230 and relatively larger cations 220 (i.e., relative to the lithium cations 230 of the glass article), such as, for example, sodium and/or potassium cations. The poisoned molten salt 202 may be regenerated by adding a phosphate salt 240. When introduced to the poisoned molten salt 202, the phosphate salt 240 may disassociate to form cations and phosphate ($PO_4^{-3}$) anions. The phosphate anions present in the poisoned molten bath 202 may react with and selectively precipitate the lithium cations 230. The selective precipitation reaction produces insoluble lithium phosphates 250, such as, for example, trilithium phosphate ($Li_3PO_4$), dilithium sodium phosphate ($Li_2NaPO_4$), and/or lithium disodium phosphate ($LiNa_2PO_4$), and a regenerated molten salt 211 that is suitable for use in further ion exchange processes. In other words, the presence of the phosphate salt creates favorable conditions for the removal of lithium cations from the salt bath via precipitation.

Figure 3B:
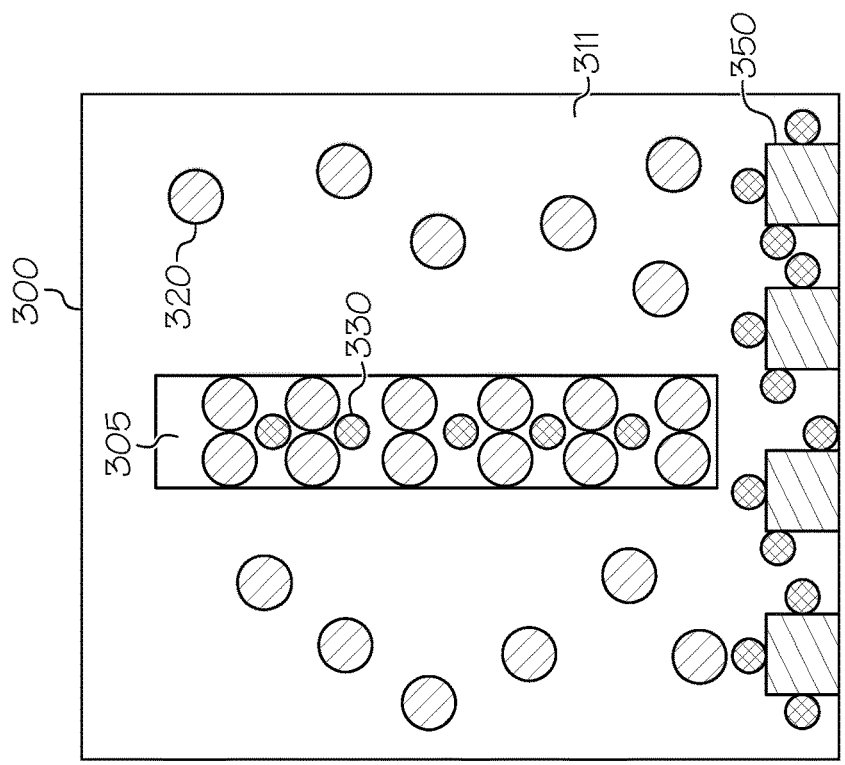
FIG. 3B schematically depicts a portion of an ion exchange process, according to one or more embodiments shown and described herein.
Figure 3A:
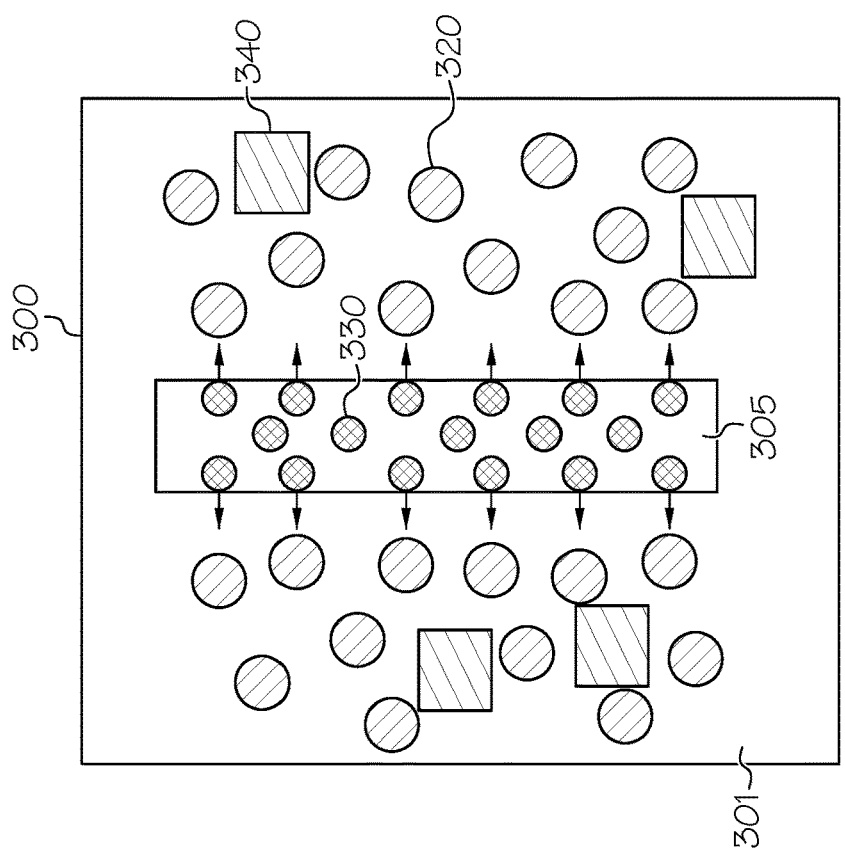
FIG. 3A schematically depicts a portion of an ion exchange process, according to one or more embodiments shown and described herein.

In particular, a poisoned molten salt may be regenerated by "spiking" the salt bath with a phosphate salt (i.e., introducing a phosphate salt between batches), as depicted in FIGS. 2A and 2B, or a phosphate salt may be present during the ion exchange process, as depicted in FIGS. 3A and 3B. For example, a glass article 305 containing lithium cations 330 may be immersed in a salt bath 300 containing relatively larger cations 320 (i.e., relative to the lithium cations 330 of the glass article), such as, for example, sodium and/or potassium cations, and a phosphate salt 340. As the lithium cations 330 diffuse from the glass article 305, the phosphate anions that have disassociated from the phosphate salt 340 may react with and selectively precipitate the dissolved lithium cations 230 to produce insoluble lithium phosphates 350 and a regenerated molten salt 311.

As indicated hereinabove, a number of methods for reducing and/or preventing decreases in the efficacy of the salt bath may be employed. However, while the introduction of regeneration media, such as silicic acid and/or phosphate salts, may reduce and/or prevent decreases in the efficacy of the salt bath resulting from the ion exchange process, these regeneration media may introduce new complications to the ion exchange process.

For example, when silicic acid particles that are too large are added to a salt bath, the silicic acid may fail to effectively neutralize the molten salt. In particular, when the silicic acid particles have an average size that is too large the silicic acid particles may sink more quickly to the bottom of the molten salt and, as a result, the probability of interactions and reactions between the silicic acid and the alkali metal oxides may be reduced. The large silicic acid particles may also accumulate as a sludge at the bottom of the salt bath over time until the system must be shut down and the salt bath must be replaced. Conversely, when the average particle size of the silicic acid particles is too small, the silicic acid particles may adhere to the surfaces of glass articles that are ion exchanged in the molten salt. This adhesion of silicic acid particles to the surfaces of the glass articles may result in defects that render the glass articles unsuitable for commercial use or, at least, require additional processing that increases production costs and reduces efficiency.

Similarly, the addition of phosphate salts to a salt bath may result in the formation of an insoluble sludge that must be removed from the salt bath and/or phosphate crystals that may adhere to the glass articles. For example, while lithium cations preferably bond with the phosphate salt over other alkali metal cations present in the salt bath, such as sodium and potassium cations, the phosphate salt may begin to react with the other alkali metal cations to form alkali metal phosphate salts, which may associate to form phosphate crystals, as the lithium cation concentration decreases. The phosphate crystals may adhere to the surfaces of glass articles that are ion exchanged in the molten salt. The presence of the phosphate crystals on the surfaces of the glass articles may retard the ion exchange process, reducing the compressive stress and depth of compression achieved, and may result in the formation of depressions and/or protrusions on the surfaces of the glass articles upon removal. Even when the formation of the phosphate crystals is minimized, the insoluble lithium phosphates will build in the salt bath over time, which requires the periodic stoppage of the process in order to remove the sludge and restore the salt bath to the original composition.

The present disclosure is directed to salt bath systems for strengthening glass articles and methods for regenerating molten salts that utilize regeneration media, such as silicic acid and/or phosphate salts, to effectively regenerate molten salts while also reducing or preventing the undesirable effects associated with the presence of these regeneration media in the molten salt.

Referring now to FIGS. 4A and 4B, a salt bath system 400 is schematically depicted. The salt bath system 400 may include a salt bath tank 402. The salt bath tank 402 may define a first interior volume 404 enclosed by at least one sidewall 406 and a salt bath composition 408 may be positioned within the first interior volume 404. The salt bath system 400 may further include a containment device 410 positioned within the first interior volume 404. The containment device 410 may define a second interior volume 412 enclosed by at least one sidewall 414. One or more regeneration media may be positioned within the second interior volume 412. The salt bath system may further include a circulation device 416 positioned proximate to an inlet 418 of the containment device 410.

In embodiments, the salt bath composition 408 may comprise an alkali metal salt. For example, the salt bath composition 408 may comprise an alkali metal nitrate, such as potassium nitrate ($KNO_3$), sodium nitrate ($NaNO_3$), lithium nitrate ($LiNO_3$), or combinations thereof. In embodiments, the salt bath composition 408 may comprise greater than or equal to 90 wt. % of the one or more alkali metal salts based on the total weight of the salt bath composition 408. For example, the salt bath composition 408 may comprise from 90 wt. % to 99.9 wt. %, from 90 wt. % to 99.5 wt. %, from 90 wt. % to 99 wt. %, from 90 wt. % to 97 wt. %, from 90 wt. % to 95 wt. %, from 90 wt. % to 93 wt. %, from 93 wt. % to 99.9 wt. %, from 93 wt. % to 99.5 wt. %, from 93 wt. % to 99 wt. %, from 93 wt. % to 97 wt. %, from 93 wt. % to 95 wt. %, from 95 wt. % to 99.9 wt. %, from 95 wt. % to 99.5 wt. %, from 95 wt. % to 99 wt. %, from 95 wt. % to 97 wt. %, from 97 wt. % to 99.9 wt. %, from 97 wt. % to 99.5 wt. %, from 97 wt. % to 99 wt. %, from 99 wt. % to 99.9 wt. %, from 99 wt. % to 99.5 wt. %, or from 99.5 wt. % to 99.9 wt. % of the one or more alkali metal salts based on the total weight of the salt bath composition 408.

In embodiments, the concentrations of the alkali metal salts in the salt bath composition 408 may be balanced based on the composition of the glass article to provide an ion exchange process that increases both the surface compressive stress at the surface of the glass article as well as the depth of compression after the ion exchange process. For example, the salt bath composition 408 may comprise a greater concentration of potassium nitrate than sodium nitrate based on the total concentration of the salt bath composition 408, or the salt bath composition 408 may comprise a greater concentration of sodium nitrate than potassium nitrate based on the total concentration of the salt bath composition 408. A greater concentration of sodium nitrate than potassium nitrate in the salt bath composition, in conjunction with a longer residence time in the molten salt bath, may result in a deeper depth of compression in the glass article.

In embodiments, the salt bath composition 408 may optionally comprise lithium nitrate in an amount less than or equal to 1 wt. % based on the total weight of the salt bath composition 408. For example, the salt bath composition 408 may comprise lithium nitrate in an amount of from 0.01 wt. % to 1 wt. %, from 0.01 wt. % to 0.8 wt. %, from 0.01 wt. % to 0.6 wt. %, from 0.01 wt. % to 0.3 wt. %, from 0.01 wt. % to 0.2 wt. %, from 0.01 wt. % to 0.1 wt. %, from 0.1 wt. % to 1 wt. %, from 0.1 wt. % to 0.8 wt. %, from 0.1 wt. % to 0.6 wt. %, from 0.1 wt. % to 0.3 wt. %, from 0.1 wt. % to 0.2 wt. %, from 0.2 wt. % to 1 wt. %, from 0.2 wt. % to 0.8 wt. %, from 0.2 wt. % to 0.6 wt. %, from 0.2 wt. % to 0.3 wt. %, from 0.3 wt. % to 1 wt. %, from 0.3 wt. % to 0.8 wt. %, from 0.3 wt. % to 0.6 wt. %, from 0.6 wt. % to 1 wt. %, from 0.6 wt. % to 0.8 wt. %, or from 0.8 wt. % to 1 wt. %, based on the total weight of the salt bath 100. When the concentration of lithium nitrate is too great (i.e., greater than 1 wt. %), either through the inclusion of lithium nitrate in the salt bath composition and/or through the diffusion of lithium cations from glass articles, the molten salt may be considered poisoned, which adversely affects the ion exchange process. Poisoned molten salt may lower the compressive stress and depth of compression of glass articles when compared to glass articles subjected to an ion exchange process in a molten salt that is not poisoned. In contrast, when the concentration of lithium nitrate is too low (i.e., less than 0.01 wt. %), the molten salt bath may be unsuitable for the strengthening of some articles, such as glass ceramic articles. In particular, excess lithium cations, which may act as nucleating agents that facilitate the formation of one or more crystalline phases, may diffuse from glass ceramic articles during ion exchange processes, which may result in the reduction of crystallization achieved and an increase in sodium-rich regions in the glass ceramic articles. Sodium-rich regions in the glass ceramic articles may lead to corrosion and/or cracking of the glass ceramic articles.

The salt bath composition 408 may be used to effectuate an ion exchange process, which exchanges metal cations of a glass article with alkali metal cations of the alkali metal salts of the salt bath composition 408. Once the salt bath composition 408 has been positioned within the first interior volume 404, the salt bath composition 408 may be heated to an elevated temperature (also referred to as an ion exchange temperature) sufficient to create a molten salt and thereby promote an ion exchange process. In embodiments, the salt bath composition 408 may be heated to a temperature of from 350° C. to 500° C. For example, the salt bath composition may be heated to a temperature of from 350° C. to 475° C., from 350° C. to 450° C., from 350° C. to 425° C., from 350° C. to 400° C., from 350° C. to 375° C., from 375° C. to 500° C., from 375° C. to 475° C., from 375° C. to 450° C., from 375° C. to 425° C., from 375° C. to 400° C., from 400° C. to 500° C., from 400° C. to 475° C., from 400° C. to 450° C., from 400° C. to 425° C., from 425° C. to 500° C., from 425° C. to 475° C., from 425° C. to 450° C., from 450° C. to 500° C., from 450° C. to 475° C., or from 475° C. to 500° C. However, if the ion exchange temperature is too high, it may be difficult to adequately control the ion exchange process and, for example, the rate of degradation of the alkali metal salts in the salt bath composition 408 may increase.

Referring still to FIG. 4A, the salt bath system 400 may include a containment device 410 positioned in the first interior volume 404. The containment device 410 may define a second interior volume 412 enclosed by at least one sidewall 414. One or more regeneration media may be positioned within the second interior volume 412. The containment device 410 may allow for contact between the salt bath composition 408 and the regeneration media and, as a result, reduce and/or prevent any decreases in the efficacy of the salt bath composition 408. Moreover, since all and/or a substantial portion of the regeneration media used in the salt bath system 400 is positioned within the containment device 410, any undesirable by-products of the one or more regeneration media remains in the containment device 410.

As a result, the complications associated with the use of regeneration media, such as silicic acid adhering to surfaces of glass articles and/or insoluble lithium phosphate sludge building up in the salt bath tank 402, may be reduced and/or prevented entirely. In turn, the containment device 410 may significantly increase the life of the salt bath composition 408 and the overall throughput of the strengthening process, which may significantly reduce operation costs. Moreover, since the regeneration media remain separate from the salt bath composition 408, the regeneration media may be removed, refreshed, and/or replaced as they become depleted without replacing the salt bath composition 408. This may further increase the efficiency of the salt bath system 400 compared to conventional salt bath systems that introduce regeneration media directly into the salt bath composition.

In embodiments, the containment device 410 may include any vessel suitable for contact with molten salt (i.e., the salt bath composition 408 heated to a temperature of from 350° C. to 500° C.) on both interior and exterior surfaces. For example, in some embodiments, the containment device 410 may include one or more sections of a size 8, schedule 10, Society of Automotive Engineers (SAE) 304 stainless steel pipe. In other embodiments (not depicted), the containment device 410 may include one or more vessels, such as baskets and/or pouches, composed of stainless steel mesh that allows for the flow of the salt bath composition 408 through the containment device 410, but prevents the displacement of the regeneration media.

As mentioned hereinabove, one or more regeneration media may be positioned within the second interior volume 412 of the containment device 410. As used herein, the term "regeneration medium" refers to any material that is effective to precipitate, filter, bind, reduce the concentration of, or remove from a molten salt bath one or more materials formed during an ion exchange process and/or considered to negatively affect the ion exchange of a glass article or otherwise be undesirable in a salt bath composition (also referred to as impurities and/or contaminants). For example, the regeneration media may include silicic acid, which, as noted hereinabove, react with and remove the decomposition products of alkali metal salts from the salt bath composition 408. Similarly, the regeneration media may include a phosphate salt, which, as noted hereinabove, may precipitate excess lithium cations from the salt bath composition 408. The regeneration media may also include alkali metal carbonates, such as potassium carbonate ($K_2CO_3$), which may be suitable for sodium scrubbing (i.e., reducing sodium nitrate to an appropriate concentration), and filtration media that may be suitable to remove debris and contaminants from the salt bath composition 408.

The regeneration media may be in any form suitable for packing in the containment device 410 while also allowing for the adequate flow of the salt bath composition 408 through the containment device 410. For example, the regeneration media include grains, rings, saddles, spheres, engineered monoliths, honeycombs, fibers, felts, active layers coated on or impregnated in an inert carrier, or combinations of these. As described in detail herein, the one or more regeneration media may be contained within the containment device 410 via the side wall 414 as well as one or more barriers disposed at both the inlet and outlet of the containment device 410. The barriers, which may be one or more mesh layers, may allow the flow of the salt bath composition 408 through the containment device 410 such that the salt bath composition 408 contacts the regeneration media, but may prevent the displacement of the regeneration media from the containment device 410 and into the first interior volume 404 of the salt bath tank 402.

In embodiments wherein the regeneration media are granular, the average particle size of the granular regeneration media may be from 5 µm to 5,000 µm. For example, in embodiments wherein the regeneration media are granular, the average particle size of the granular regeneration media may be from 5 µm to 2,000 µm, from 5 µm to 1,000 µm, from 5 µm to 500 µm, from 5 µm to 100 µm, from 5 µm to 50 µm, from 50 µm to 5,000 µm, from 50 µm to 2,000 µm, from 50 µm to 1,000 µm, from 50 µm to 500 µm, from 50 µm to 100 µm, from 100 µm to 5,000 µm, from 100 µm to 2,000 µm, from 100 µm to 1,000 µm, from 100 µm to 500 µm, from 500 µm to 5,000 µm, from 500 µm to 2,000 µm, from 500 µm to 1,000 µm, from 1,000 µm to 5,000 µm, from 1,000 µm to 2,000 µm, or from 2,000 µm to 5,000 µm. In embodiments, greater than or equal to 90% of the regeneration medium may have a particle size greater than 5 µm. For example, greater than or equal to 92%, 94%, 96%, 98%, 99% or 99.5% of the regeneration medium may have a particle size greater than 5 µm When the average particle size of the granular regeneration media is smaller (i.e., less than 5 µm), the regeneration may pack too tightly and the pressure drop across the containment device 410 may be too significant for the efficient operation of the salt bath system 400. Conversely, when the average particle size of the granular regeneration media is larger (i.e., greater than 5 µm), some species, such as insoluble lithium phosphates, may favourably precipitate onto the surface of the larger particles. This decreases the amount of relatively smaller species that may be capable of exiting the containment device 410 and contaminating the salt bath composition 408.

In embodiments, the regeneration medium may include silicic acid aggregates. As used herein, the term "silicic acid aggregate" may refer to a cluster or unit formed by the collection of silicic acid nanoparticles into a single mass. As described hereinabove, the silicic acid aggregates may react with the decomposition products of the one or more alkali metal salts in the salt bath composition 408 to form an unreactive (e.g., does not etch or corrode the surface of glass articles) silicate and water. Accordingly, the silicic acid aggregates may reduce the concentration of the decomposition products of the alkali metal salts within the salt bath composition 408 and neutralize the salt bath composition 408.

In embodiments, the silicic acid aggregates may have an average particle size of from 5 µm to 400 µm, as measured by laser diffraction particle size analysis. For example, the silicic acid aggregates may have an average particle size of from 5 µm to 350 µm, from 5 µm to 300 µm, from 5 µm to 250 µm, from 5 µm to 200 µm, from 5 µm to 50 µm, from 50 µm to 400 µm, from 50 µm to 350 µm from 50 µm to 300 from 50 µm to 250 from 50 µm to 200 from 200 µm to 400 from 200 µm to 350 from 200 µm to 300 from 200 µm to 250 from 250 µm to 400 from 250 µm to 350 from 250 µm to 300 from 300 µm to 400 from 300 µm to 350 or from 350 µm to 400 as measured by laser diffraction particle size analysis. When the silicic acid aggregates have a smaller average particle size (e.g., less than 5 µm), any silicic acid aggregates that are displaced from the containment device 410, due to any circumstance, may readily adhere to the surface of glass articles and cause defects that render the glass article unsuitable for commercial use.

In embodiments, the specific surface area of the silicic acid aggregates may be greater than or equal to 200 $m^2/g$, as measured by the Brunauer-Emmett-Teller (BET) method. For example, the specific surface area of the silicic acid aggregates may be from 200 $m^2/g$ to 600 $m^2/g$, from 200 $m^2/g$ to 550 $m^2/g$, from 200 $m^2/g$ to 500 $m^2/g$, from 200 $m^2/g$ to 450 $m^2/g$, from 200 $m^2/g$ to 400 $m^2/g$, from 200 $m^2/g$ to 350 $m^2/g$, from 200 $m^2/g$ to 300 $m^2/g$, from 200 $m^2/g$ to 250 $m^2/g$, from 250 $m^2/g$ to 600 $m^2/g$, from 250 $m^2/g$ to 550 $m^2/g$, from 250 $m^2/g$ to 500 $m^2/g$, from 250 $m^2/g$ to 450 $m^2/g$, from 250 $m^2/g$ to 400 $m^2/g$, from 250 $m^2/g$ to 350 $m^2/g$, from 250 $m^2/g$ to 300 $m^2/g$, from 300 $m^2/g$ to 600 $m^2/g$, from 300 $m^2/g$ to 550 $m^2/g$, from 300 $m^2/g$ to 500 $m^2/g$, from 300 $m^2/g$ to 450 $m^2/g$, from 300 $m^2/g$ to 400 $m^2/g$, from 300 $m^2/g$ to 350 $m^2/g$, from 350 $m^2/g$ to 600 $m^2/g$, from 350 $m^2/g$ to 550 $m^2/g$, from 350 $m^2/g$ to 500 $m^2/g$, from 350 $m^2/g$ to 450 $m^2/g$, from 350 $m^2/g$ to 400 $m^2/g$, from 400 $m^2/g$ to 600 $m^2/g$, from 400 $m^2/g$ to 550 $m^2/g$, from 400 $m^2/g$ to 500 $m^2/g$, from 400 $m^2/g$ to 450 $m^2/g$, from 450 $m^2/g$ to 600 $m^2/g$, from 450 $m^2/g$ to 550 $m^2/g$, from 450 $m^2/g$ to 500 $m^2/g$, from 500 $m^2/g$ to 600 $m^2/g$, from 500 $m^2/g$ to 550 $m^2/g$, or from 550 $m^2/g$ to 600 $m^2/g$. The specific surface area of the silicic acid aggregates may directly correlate to the reaction rate constant (k) of the reaction between the silicic acid aggregates and the decomposition products of the alkali metal salts, as described herein. That is, the greater the specific surface area of the silicic acid aggregates, the greater the potential for reaction with the decomposition products present within the molten salt bath. This may allow for greater control over the properties of the salt bath composition 408 and increased chemical durability of the glass article while using fewer silicic acid aggregates.

In embodiments, the regeneration medium may include silicic acid aggregates in an amount sufficient to effectively neutralize the salt bath composition 408. The Surface Hydrolytic Resistance (SHR) of a glass article that has been ion exchanged in a molten may be the most reliably discerning metric for determining the extent to which the salt bath composition 408 is neutralized. The Surface Hydrolytic Resistance of a glass article may be measured by the Surface Glass Test, as detailed in USP <660>. When measuring the Surface Hydrolytic Resistance of a glass article with the Surface Glass Test, a glass vial or container composed of the glass article is filled with carbon dioxide-free or purified water. The filled vial or container is then subjected to an autoclave cycle at approximately 121° C. for approximately 1 hour. The resulting leachate within the vial or container is then titrated to neutral by a weak hydrochloric acid (e.g., 0.01 M HCl) in the presence of methyl red. The volume of titrant per 100 mL of leachate is used to determine the Surface Hydrolytic Resistance of the glass article. Generally, a greater a titrant volume corresponds to an inferior chemical durability (that is, the leachate contains more glass components released by the glass and thus requires more titrant to offset the change in pH due to the presence of the glass components). In turn, an inferior chemical durability generally corresponds to a greater degradation of the surface of the glass article and a greater concentration of alkali metal oxides within the salt bath used for ion exchange.

A low titrant volume and/or high chemical durability may be desired in strengthened glass articles, particularly strengthened glass articles intended for use as pharmaceutical packaging. Generally, a titrant volume less than 1.5 mL is desired for Type I glasses. However, as described hereinabove, the presence of decomposition products, such as alkali hydroxides or alkali oxides, within a molten salt bath used for ion exchange may corrode and/or etch the surface of the glass article. This etching may result in increased titrant volumes, which correspond to a decrease in chemical durability. Typically, the titrant volume of a strengthened glass article will increase as a function of the time spent undergoing ion exchange. That is, the longer a glass article is contacted with a molten salt bath, the greater the titrant volume. For example, a glass article that undergoes ion exchange for approximately 3 hours may result in a titrant volume of approximately 0.9 mL while a glass article that undergoes ion exchange for approximately 10 hours may result in a titrant volume of approximately 1.1 mL. As a result, the chemical durability of strengthened glass articles subjected to ion exchange processes in a neutralized molten salt may be increased compared to those subjected to ion exchange processes in a conventional molten salt (i.e., molten salt that has not been neutralized by silicic acid aggregates and, as a result, includes alkali hydroxides and/or alkali oxides).

In embodiments, particularly in embodiments wherein the salt bath system is used to strengthen glass articles intended for use as pharmaceutical packaging, the regeneration medium may include silicic acid aggregates in an amount from 0.1 wt. % to 10 wt. % based on the total weight of the salt bath composition. For example, the regeneration medium may include silicic acid aggregates in an amount from 0.1 wt. % to 7 wt. %, from 0.1 wt. % to 5 wt. %, from 0.1 wt. % to 3 wt. %, from 0.1 wt. % to 1 wt. %, from 0.1 wt. % to 0.5 wt. %, from 0.5 wt. % to 10 wt. %, from 0.5 wt. % to 7 wt. %, from 0.5 wt. % to 5 wt. %, from 0.5 wt. % to 3 wt. %, from 0.5 wt. % to 1 wt. %, from 1 wt. % to 10 wt. %, from 1 wt. % to 7 wt. %, from 1 wt. % to 5 wt. %, from 1 wt. % to 3 wt. %, from 3 wt. % to 10 wt. %, from 3 wt. % to 7 wt. %, from 3 wt. % to 5 wt. %, from 5 wt. % to 10 wt. %, from 5 wt. % to 7 wt. %, or from 7 wt. % to 10 wt. % based on the total weight of the salt bath composition. When the regeneration medium includes fewer silicic acid aggregates (i.e., less than 0.1 wt. %), the entire amount of the silicic acid may react to unreactive silicates and water before the molten salt may be effectively neutralized.

In embodiments, the regeneration medium may include one or more phosphate salts capable of precipitating excess lithium cations from the salt bath composition 408. In embodiments, the phosphate salts may include alkali metal phosphate salts, such as trisodium phosphate ($Na_3PO_4$), tripotassium phosphate ($K_3PO_4$), dispodium phosphate ($Na_2HPO_4$), dipotassium phosphate ($K_2HPO_4$), sodium triphosphate ($Na_5P_3O_{10}$), potassium triphosphate ($K_5P_3O_{10}$), disodium diphosphate ($Na_2H_2P_2O_7$), tetrasodium pyrophosphate ($Na_4P_2O_7$), potassium pyrophsophate ($K_4P_2O_7$), sodium trimetaphosphate ($Na_3P_3O_9$), potassium trimetaphosphate ($K_3P_3O_9$), or combinations thereof. In embodiments, the phosphate salts may include anhydrous phosphate salts, such as anhydrous trisodium phosphate, which may contain 10 percent (%) or less water and may have a chemical purity of at least 97% or greater. As described hereinabove, the phosphate salts may disassociate into cations, such as sodium and/or potassium cations, and phosphate anions, which may selectively precipitate lithium cations to produce insoluble lithium phosphates and maintain a suitable lithium nitrate concentration in the salt bath composition 408.

In embodiments, the phosphate salts may have an average particle size of from 5 μm to 400 μm as measured by laser diffraction particle size analysis. For example, the phosphate salts may have an average particle size of from 5 μm to 350 μm, from 5 μm to 300 μm, from 5 μm to 250 μm, from 5 μm to 200 μm, from 5 μm to 50 μm, from 50 μm to 400 μm, from 50 μm to 350 μm, from 50 μm to 300 μm, from 50 μm to 250 μm, from 50 μm to 200 μm, from 200 μm to 400 μm, from 200 μm to 350 μm, from 200 μm to 300 μm, from 200 μm to 250 μm, from 250 μm to 400 μm, from 250 μm to 350 μm, from 250 μm to 300 μm, from 300 μm to 400 μm, from 300 μm to 350 μm, or from 350 μm to 400 μm as measured by laser diffraction particle size analysis. When the phosphate salts have a smaller average particle size (e.g., less than 5 μm), any phosphate salts that are displaced from the containment device, due to any circumstance, may readily adhere to the surface of glass articles and cause defects that render the glass articles unsuitable for commercial use. Moreover, larger average particle sizes (e.g., greater than or equal to 5 μm) may reduce the solubility of the phosphate salts in the salt bath composition 408 at ion exchange temperatures and, in turn, reduce the amount of excess phosphate anions in the molten salt bath, which may form phosphate crystals on the surface of the glass articles as discussed hereinabove.

In embodiments, the regeneration medium may include the phosphate salts in an amount sufficient to effectively maintain the concentration of lithium nitrate in the salt bath composition at an amount less than or equal to 1 wt. % based on the total weight of the salt bath composition. The regeneration medium may include the phosphate salts in an amount of from 0.1 wt. % to 10 wt. % based on the total weight of the salt bath composition. For example, the regeneration medium may include the phosphate salts in an amount of from 0.1 wt. % to 7 wt. %, from 0.1 wt. % to 5 wt. %, from 0.1 wt. % to 3 wt. %, from 0.1 wt. % to 1 wt. %, from 0.1 wt. % to 0.5 wt. %, from 0.5 wt. % to 10 wt. %, from 0.5 wt. % to 7 wt. %, from 0.5 wt. % to 5 wt. %, from 0.5 wt. % to 3 wt. %, from 0.5 wt. % to 1 wt. %, from 1 wt. % to 10 wt. %, from 1 wt. % to 7 wt. %, from 1 wt. % to 5 wt. %, from 1 wt. % to 3 wt. %, from 3 wt. % to 10 wt. %, from 3 wt. % to 7 wt. %, from 3 wt. % to 5 wt. %, from 5 wt. % to 10 wt. %, from 5 wt. % to 7 wt. %, or from 7 wt. % to 10 wt. % based on the total weight of the salt bath composition. When the regeneration medium includes the phosphate salts in an amount less than 0.1 wt. %, all or a substantial portion of the phosphate anions disassociated from the phosphate salts may precipitate before the ion exchange process is completed, resulting in the concentration of lithium cations in the molten salt increasing. Accordingly, the amount of lithium nitrate in the salt bath composition 408 increasing to an amount greater than 1 wt. %. In contrast, when the regeneration medium includes the phosphate salts in an amount greater than 10 wt. %, the concentration of lithium nitrate in the salt bath composition 408 may be reduced to an amount less than 0.01 wt. %, resulting in excess lithium cations diffusing from the glass articles and an increase in sodium-rich regions in the glass articles.

In embodiments, the regeneration medium may include one or more materials capable of filtering one or more contaminants from the salt bath composition 408 (also referred to as filtering media). As used herein, the term "contaminant" refers to debris that are introduced into the salt bath composition 408 during the general operation of the salt bath system. That is, contaminants are any material or compound in the salt bath composition that are generally considered undesirable and/or may negatively affect the ion exchange process. Contaminants may include dust/debris, broken glass pieces, particles created from the corrosion or abrasion of components of the salt bath system, such as the salt bath tank, nitrogen oxide species, excess water or combinations thereof. In embodiments, the filtering media may include porous membranes and/or matrices, such as, for example, porous metal oxides, stainless steel powder compacts or screens, porous alumina filters, porous silica filters, or combinations thereof. The filtering media may bind and/or trap contaminants while allowing for the relatively free flow of the salt bath composition 408, effectively filtering all or a portion of the contaminants from the salt bath composition 408.

In embodiments, the filtering media may have an average pore size less than or equal to 20 μm as measured by mercury intrusion porosimetry (MIP). For example, the filtering media may have an average pore size of from 0.2 μm to 20 μm, from 0.2 μm to 16 μm, from 0.2 μm to 12 μm, from 0.2 μm to 8 μm, from 0.2 μm to 4 μm, from 0.2 μm to 2 μm, from 2 μm to 20 μm, from 2 μm to 20 μm, from 2 μm to 16 μm, from 2 μm to 12 μm, from 2 μm to 8 μm, from 2 μm to 4 μm, from 4 μm to 20 μm, from 4 μm to 16 μm, from 4 μm to 12 μm, from 4 μm to 8 μm, from 8 μm to 20 μm, from 8 μm to 16 μm, from 8 μm to 12 μm, from 12 μm to 20 μm, from 12 μm to 16 μm, or from 16 μm to 20 μm as measured by MIP. When the filtering media have a smaller average pore size (e.g., less than 0.2 μm), the pressure drop across the filtering media may be too great. In contrast, when the filtering media may have a larger average pore size (e.g., greater than 20 μm), a significant amount of the contaminants may pass through the filtering media without being filtered from the salt bath composition 408.

Referring now to FIG. 4C, an expanded view of the containment device 410 is depicted. As depicted in FIG. 4C, the containment device may include one or more "regeneration zones" positioned within the second interior volume 412, each comprising one or more regeneration media. As used herein, the term "regeneration zone" refers to a portion of an interior volume that is at least partially separated from other portions of the interior volume via a divider and/or barrier. For example, the containment device 410 depicted in FIG. 4C includes a first regeneration zone 420, a second regeneration zone 422, and a third regeneration zone 424. The containment device 410 depicted in FIG. 4C includes sieves 426a-426d positioned between the regeneration zones, as well as enclosing the inlet 418 and the outlet 428 of the containment device 410. The sieves 426a-426d may allow for the flow of the salt bath composition 408 while also preventing the movement of the regeneration media through the sieve. In embodiments, the sieves 426a-426d may include openings having effective diameters less than or equal to 15% of the average particle size of the regeneration medium. For example, the sieves 426a-426d may include openings having effective diameters less than or equal to 10%, 5%, or 2.5% of the average particle size of the regeneration medium. In some embodiments, the sieves 426a-426d may comprise a mesh having an average opening size less than the average particle size of the regeneration media positioned within the second interior volume 412. Accordingly, the one or more sieves may have a mesh number greater than or equal to 70. In embodiments, the sieves may have a mesh number of 70, 80, 100, 120, 140, 170, 200, 230, 270, 325, 400, 450, 500, or even 635, based on the American National Standard for Industrial Wire Cloth (American Standard ASTM-E11). In other embodiments, the sieves 426a-426d may comprise a porous filtering device, such as a sintered porous metal, ceramic, or glass, having an average opening size less than the average particle size of the regeneration media positioned within the second interior volume 412.

In embodiments, each regeneration zone may include a majority of one regeneration medium. For example, in embodiments, the first regeneration zone 420 may include phosphate salts in an amount greater than 50 wt. % based on the total weight of the regeneration media in the first regeneration zone 420, and the second regeneration zone 422 may include silicic acid aggregates in an amount greater than 50 wt. % based on the total weight of the regeneration media in the second regeneration zone 422. In embodiments, each regeneration zone may include only one regeneration medium. For example, the first regeneration zone 420 may include phosphate salts in an amount greater than 99 wt. % based on the total weight of the regeneration media in the first regeneration zone 420. In other embodiments, each regeneration zone may be a blend and/or gradient of two or more regeneration media.

Referring again to FIGS. 4A-4C, since the regeneration media are prevented from leaving the regeneration zones, the containment device 410 may allow for the regeneration (e.g., the precipitation of excess lithium cations from and/or the neutralization of) the salt bath composition 408 while also preventing any undesirable by-products of the regeneration from entering the first interior volume 404. Accordingly, in embodiments, the portion of the salt bath composition 408 positioned in the first interior volume 404 and exterior to the second interior volume 410 may be substantially free of the regeneration media. As used herein, the term "substantially free" of a compound may refer to a mixture that comprises less than 0.1 wt. % of the compound. For example, the salt bath composition, which may be substantially free of regeneration media, may comprise regeneration media in an amount less than 0.1 wt. %, less than 0.08 wt. %, less than 0.06 wt. %, less than 0.04 wt. %, less than 0.02 wt. %, or less than 0.01 wt. % based on the total weight of the salt bath composition 408.

Referring again to FIG. 4A, the containment device 410 may be positioned within the first interior volume 404. However, it should be understood that other embodiments are contemplated and possible. Referring to FIG. 4B by way of example, alternatively and/or additionally, the salt bath system 400 may include a containment device 410 positioned outside the first interior volume 404. The positioning of the containment device 410 outside the first interior volume 404 may allow for the regeneration of the salt bath composition 408 at a temperature less than the ion exchange temperature of the salt bath composition 408. Without being bound by any particular theory, it is believed that the regeneration of the salt bath composition 408 at a temperature less than the ion exchange temperature of the salt bath composition 408 may increase the efficiency of the one or more regeneration media. For example, as noted herein, phosphate anions, which have disassociated from phosphate salts, may selectively precipitate excess lithium cations to produce lithium phosphate salts. However, as the temperature of the salt bath composition 408 increases, the solubility and disassociation of the lithium phosphate salts also increases and the ability of the phosphate anions to precipitate lithium cations decreases. Accordingly, the efficiency of the one or more regeneration media may be maximized in embodiments wherein the containment device 410 is positioned outside the first interior volume 404. However, it should be understood that the salt bath composition 408 should remain a liquid (i.e., a molten salt) throughout the regeneration process or the salt bath system 400 may become inoperable due to the inability of the salt bath composition 408 to flow through the containment device 410. Indeed, even if the salt bath composition 408 remains a liquid albeit having a significant viscosity, the increased efficiency of the one or more regeneration media may be outweighed by the reduced flow rate of the slat bath composition 408 through the containment device 410.

Referring still to FIGS. 4A-4C, the salt bath system 400 may include a circulation device 416 proximate to an inlet 418 of the containment device 410. While the inlet 418 of the containment device 410 depicted in FIGS. 4A-4C is proximate to the bottom of the salt bath tank 402, it should be understood that in other embodiments the inlet 418 of the containment device 410 may be proximate to the top of the salt bath tank 402. The circulation device 416 may be operable to to circulate the salt bath composition 408 through the containment device 410. In operation, the circulation device may be operable to introduce the salt bath composition 408 into the inlet 418, through the first regeneration zone 420, through the second regeneration zone 422, which is positioned downstream of the first regeneration zone 420, through the third regeneration zone 422, which is positioned downstream of the second regeneration zone 422, and out of the containment device 410 through the outlet 428. As used herein, the terms "downstream" refers to the positioning of components of a system relative to a direction of flow of materials through the system. For example, a second component of a system may be considered "downstream" of a first component of the system if materials flowing through the system encounter the first component before encountering the second component. Independent of the circulation of the salt bath composition 408 through the containment device 410, it is believed that the circulation of the salt bath composition 408 in the first interior volume 404 may improve the uniformity and availability of desirable species throughout the first interior volume 404 and, as a result, improve the uniformity of the strengthened glass articles produced by the salt bath system 400.

The circulation device 416 may include any device suitable to circulate the salt bath composition 408 through the containment device 410. For example, the circulation device 416 may include a pump, such as an electromagnetic pump, an impeller, a gas injection system, such as an oxygen bubbler, or combinations thereof. The circulation device 416 may be selected based on various factors, such as the composition of the salt bath composition 408, the position of the containment device 410 (e.g., inside and/or outside of the first interior volume 404 of the salt bath tank 402), and/or the position of the inlet 418 of the containment device 410 (e.g., an impeller may be more suitable for use when the inlet 418 of the containment device 410 is proximate to the surface of the salt bath tank 402). In embodiments, the salt bath composition 408 may be circulated without the need for a mechanical agitator, such as a pump or impeller. For example, localized areas of the salt bath composition 408 proximate to the inlet 418 may be selectively heated, which thermally induce the circulation of the salt bath composition 408 via buoyancy differences of the selectively heated portion of the salt bath. In embodiments, the containment device 410 may be coupled directly to the circulation device 416. For example, in embodiments, such as embodiments wherein the one or more baskets and/or pouches composed of a stainless steel mesh, the containment device 410 may be coupled directly to an impeller that rotates the containment device 410 through the first interior volume 404 of the salt bath tank 402 and causes the salt bath composition 408 to circulate through the containment device 410.

In embodiments, the salt bath composition 408 may be circulated through the containment device 410 at a rate sufficient to effectively regenerate the molten salt. Accordingly, the salt bath composition 408 may be circulated through the containment device 410 at a rate of from 0.001 vol/hr to 10 vol/hr. Put more simply, from 0.1% to 2000% of the total volume of the salt bath composition 408 may be circulated through the containment device 410 every hour. In embodiments, the salt bath composition 408 may be circulated through the containment device 410 at a rate of from 0.001 vol/hr to 1 vol/hr, from 0.001 vol/hr to 0.1 vol/hr, from 0.001 vol/hr to 0.01 vol/hr, from 0.01 vol/hr to 10 vol/hr, from 0.01 vol/hr to 1 vol/hr, from 0.01 vol/hr to 0.1 vol/hr, from 0.1 vol/hr to 10 vol/hr, from 0.1 vol/hr to 1 vol/hr, or even from 1 vol/hr to 10 vol/hr. When the flow rate of the salt bath composition 408 through the containment device 410 is too fast (i.e., greater than 10 vol/hr), the glass articles undergoing ion exchange in the molten salt may be disturbed, which can result in glass breakage. Conversely, when the flow rate of the salt bath composition 408 through the containment device 410 is too slow (i.e., less than 0.001 vol/hr), the molten salt may not be regenerated quickly enough to prevent a decrease in the efficacy of the salt bath.

In embodiments, the circulation device 416 may be positioned proximate to the bottom of the salt bath tank 402. Without being bound by any particular theory, it is believed that contaminants and/or regeneration medium that has been displaced from the containment device will generally be denser than the molten salt and, as a result, will sink to the bottom of the salt bath tank 402 over time. As such, when the circulation device 416 is positioned proximate to the bottom of the salt bath tank 402, portions of the molten salt more likely to contain contaminants and loose regeneration medium will be preferentially circulated through the containment device 410. This may reduce the number of salt bath exchanges through the containment device before the molten salt is regenerated.

As noted hereinabove, the salt bath composition 408 of the salt bath system may be heated to an ion exchange temperature to form a molten salt and one or more glass articles may be submerged within the molten salt bath in order to effectuate an ion exchange between the molten salt and the glass articles. Although, for example, FIGS. 1A and 1B show the glass article 105 completely immersed in the salt bath 100, it should be understood that, in embodiments, only a portion of the glass article 105 may be contacted with the salt bath 100. The glass article 105 may be brought into contact with the molten salt through immersion in the salt bath 100, or through spraying, dipping, or other similar means of contacting the glass article 105 with the salt bath 100. The glass article 105 may be brought into contact with the salt bath 100 multiple times, including, but not limited to, dipping the glass article 105 into the salt bath 100

The glass articles may be contacted with the molten salt for a treatment time sufficient to create a surface compressive stress at the surface of the glass article that extends to a depth of compression. In embodiments, the glass articles may be contacted with the molten salt bath for a treatment time of from about 20 minutes to about 20 hours. For example, the glass article may be contacted with the molten salt bath for a treatment time of from about 20 minutes to about 15 hours, from about 20 minutes to about 10 hours, from about 20 minutes to about 5 hours, from about 20 minutes to about 1 hour, from about 1 hour to about 20 hours, from about 1 hour to about 15 hours, from about 1 hour to about 10 hours, from about 1 hour to about 5 hours, from about 5 hours to about 20 hours, from about 5 hours to about 15 hours, from about 5 hours to about 10 hours, from about 10 hours to about 20 hours, from about 10 hours to about 15 hours, or from about 15 hours to about 20 hours.

As the ion exchange process proceeds, the salt bath composition 408 may be continuously regenerated as described hereinabove. For example, as the ion exchange process proceeds, the salt bath composition 408 may be circulated through a containment device 410, positioned within and/or outside the first interior volume 404 of the salt bath tank 402, via a circulation device 416. The circulation of the salt bath composition 408 through the containment device 410, which may include one or more regeneration media within the defined interior volume, may remove one or more impurities from the salt bath composition 408 that formed during the ion exchange process. Put more simply, the circulation of the salt bath composition 408 through the containment device 410 may contact the salt bath composition 408 with the one or more regeneration media, which may reduce a concentration of one or more impurities formed during the ion exchange process and continuously regenerated the salt bath composition 408.

In embodiments, the glass articles are removed from contact with the molten salt after the ion exchange process. The resulting glass article, which has undergone ion exchange, may have a compressive stress at its surface that extends to a depth of compression. The compressive stress and depth of compression increase the resistance of the glass article to breakage following mechanical insults and, as a result, the glass article may be a strengthened glass article after the ion exchange process.

EXAMPLES

The following examples illustrate one or more features of the present disclosure. It should be understood that these examples are not intended to limit the scope of the disclosure or the appended claims.

Example 1

In Example 1, the concept of the present disclosure was evaluated on a 10-kilogram scale. A containment/circulation combination device was prepared including two mesh baskets constructed of SAE 304 stainless steel, each containing 5 grams of silicic acid aggregates, attached to a stainless steel impeller, which, in turn, was attached to a motor. The mesh baskets were then lowered into 10 kilograms of molten salt consisting of technical grade potassium nitrate (i.e., greater than 98.5 wt. % potassium nitrate) and rotated at a rate sufficient to induce a convective flow through the mesh baskets. Next, 20 batches that included 45 Type I glass vials (as described in U.S. Pat. No. 8,551,898) per batch were each subjected to an ion exchange process at 470° C. for 5.5 hours in the molten salt over a period of 29 days at a rate of approximately 1 ion exchange process per day. The mesh baskets were removed from the molten salt prior to each ion exchange process and replaced after each ion exchange process was completed. After the ion exchange processes were complete, the SHR of each glass vial was measured by the Surface Glass Test, as detailed in USP <660>. This process was repeated with 10 batches over a period of approximately 13 days except that no silicic acid was included in the mesh baskets. The results were plotted as a function of time and as a function of the number of glass vials per kilogram of molten salt, and are graphically depicted in FIGS. 5A and 5B.

Figure 5A:
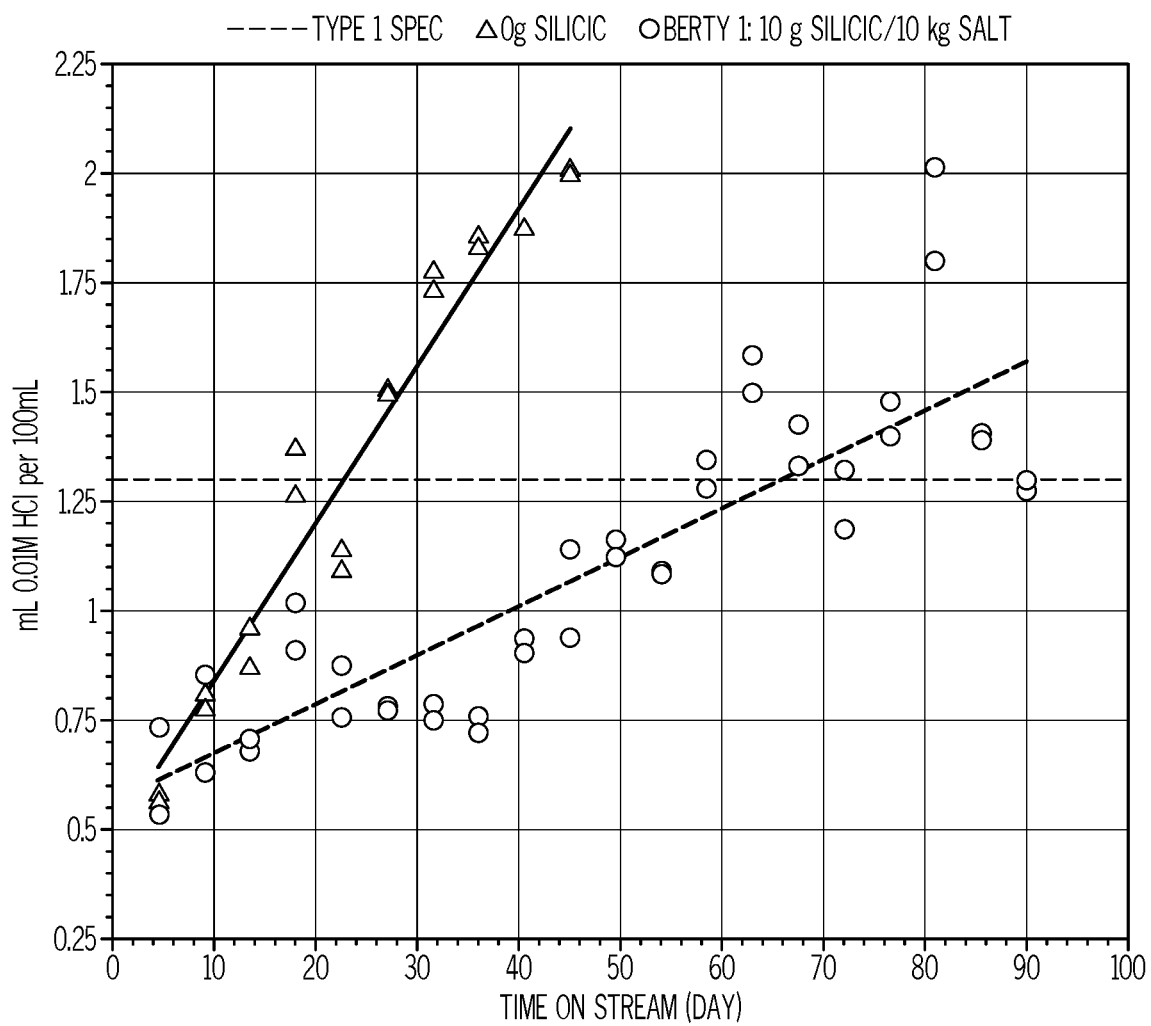
FIG. 5A graphically plots Surface Hydrolytic Resistance titrant volume (mL; y-axis) as a function of time (days; x-axis) for salt bath systems for strengthening glass articles using various amounts of a regeneration medium, according to one or more embodiments shown and described herein.
Figure 5B:
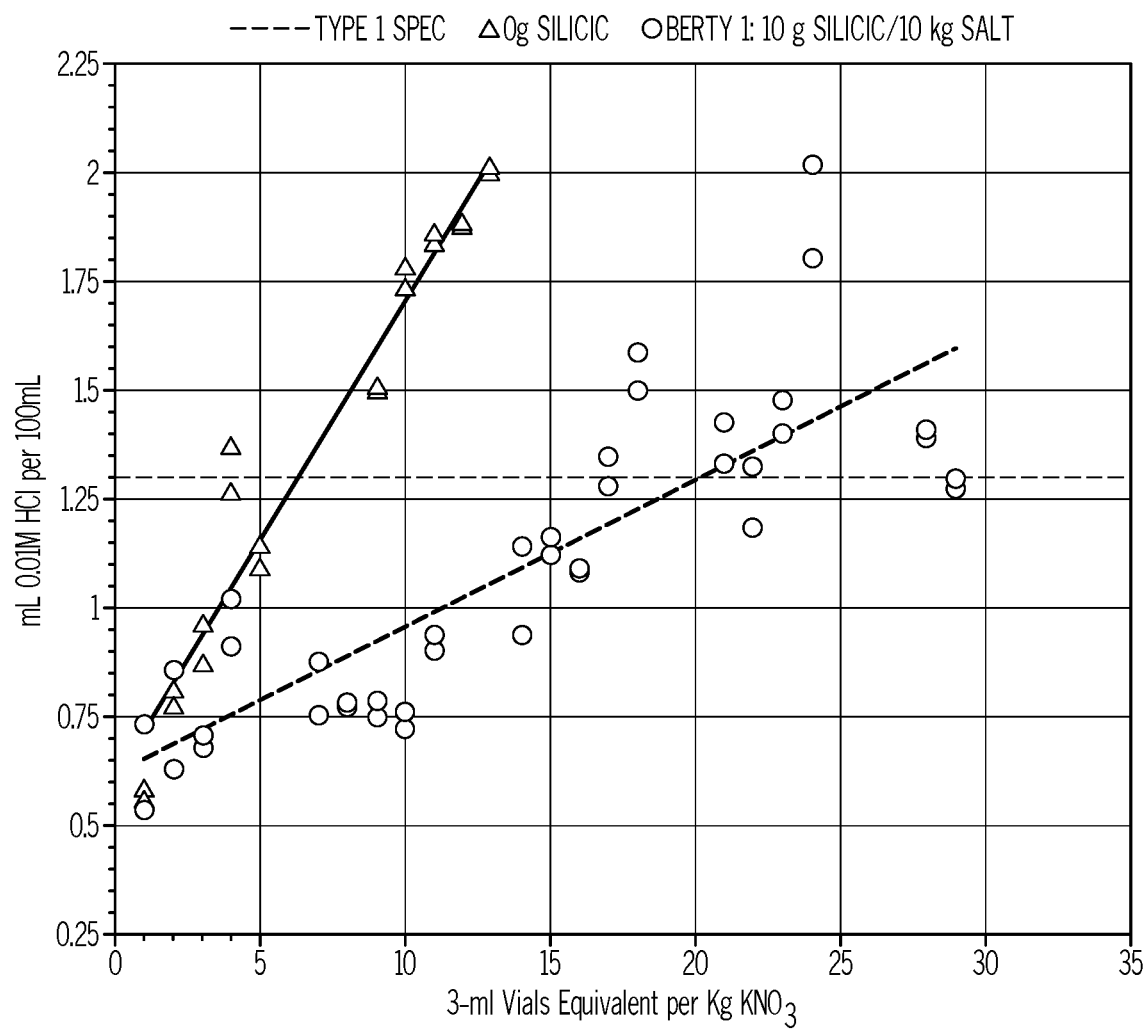
FIG. 5B graphically plots Surface Hydrolytic Resistance titrant volume (mL; y-axis) as a function of the number of glass articles strengthened (vials per kilogram of alkali metal salt; x-axis) for salt bath systems for strengthening glass articles using various amounts of a regeneration medium, according to one or more embodiments shown and described herein.

As depicted in FIGS. 5A and 5B, the desired titrant volume for Type I glasses (approximately 1.3 mL) was exceeded before 7 days elapsed when the mesh baskets did not contain any silicic acid. That is, when the mesh baskets did not contain any silicic acid, less than 25 glass vials per kilogram of molten salt were able to be effectively strengthened. Conversely, when 10 grams total of silicic acid was included, the desired titrant volume for Type I glasses was not exceeded until approximately 20 days had elapsed. That is, when the mesh baskets contained 10 grams of silicic acid, nearly 70 glass vials per kilogram of molten salt were able to be effectively strengthened. This indicates that a regeneration medium including silicic acid may effectively neutralize a molten salt, even when confined to a single area of the molten salt. Indeed, the presence of silicic acid nearly tripled the longevity of the molten salt, which greatly increased the efficiency of the ion exchange process.

Example 2

In Example 2, the compressive stresses and depths of compression of the glass vials of Example 1, which were subjected to ion exchange processes in the presence of 10 grams total of silicic acid, were measured. In particular, the compressive stresses and depths of compression of the glass vials of each batch were measured and then plotted as a function of time and as a function of the number of glass vials per kilogram of the molten salt. The compressive stresses were measured by surface stress meter (FSM) using commercially available instruments, such as the FSM-6000 commercially available from Orihara Industrial Co., Ltd. (Japan). The depths of compression were measured by the same commercially available instruments at a wavelength of 596 nm. The results of Example 2 are graphically depicted in FIGS. 6A and 6B.

Figure 6A:
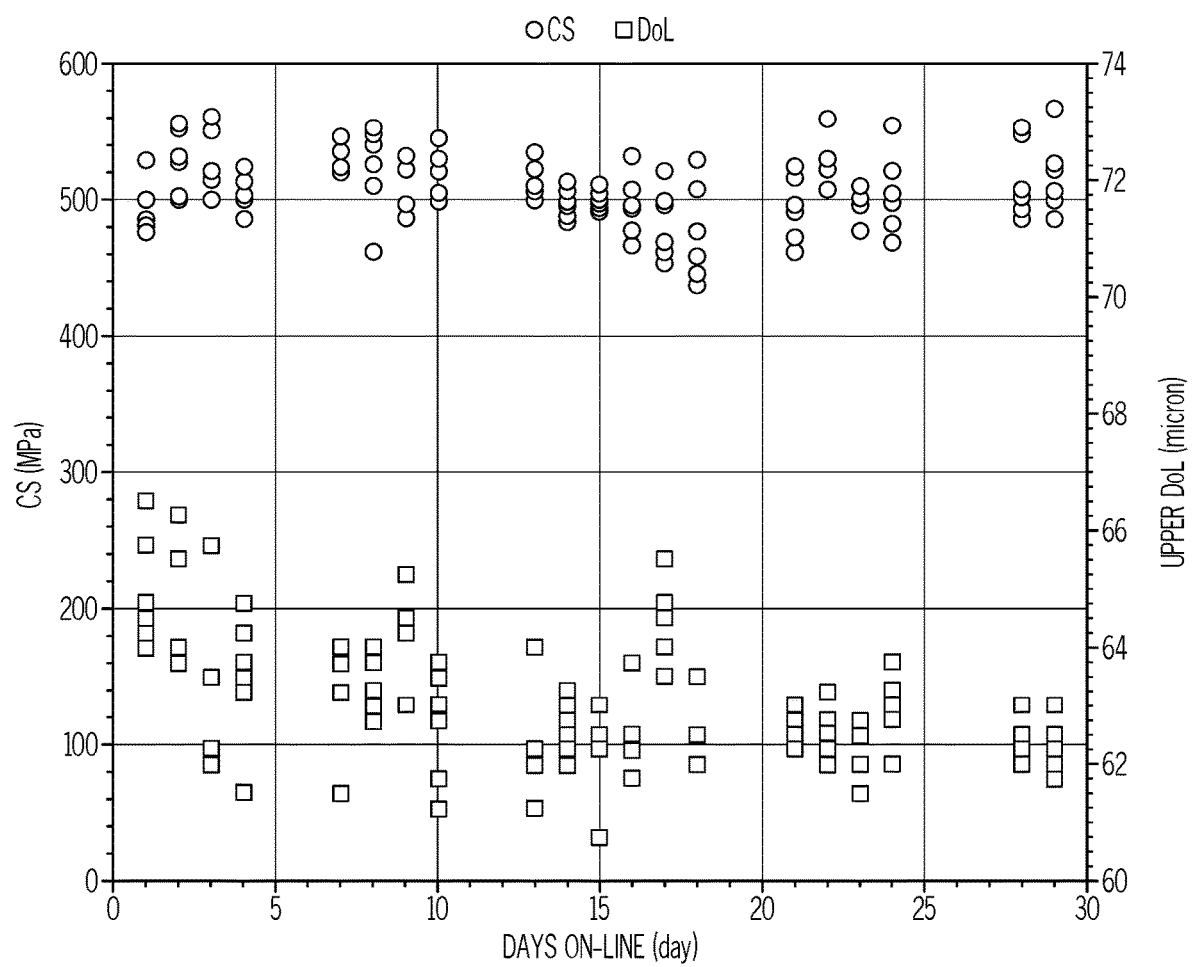
FIG. 6A graphically plots surface compressive stress (MPa; left y-axis) and depth of compression (μm; right y-axis) as a function of time (days; x-axis) for a salt bath system for strengthening glass articles, according to one or more embodiments shown and described herein.
Figure 6B:
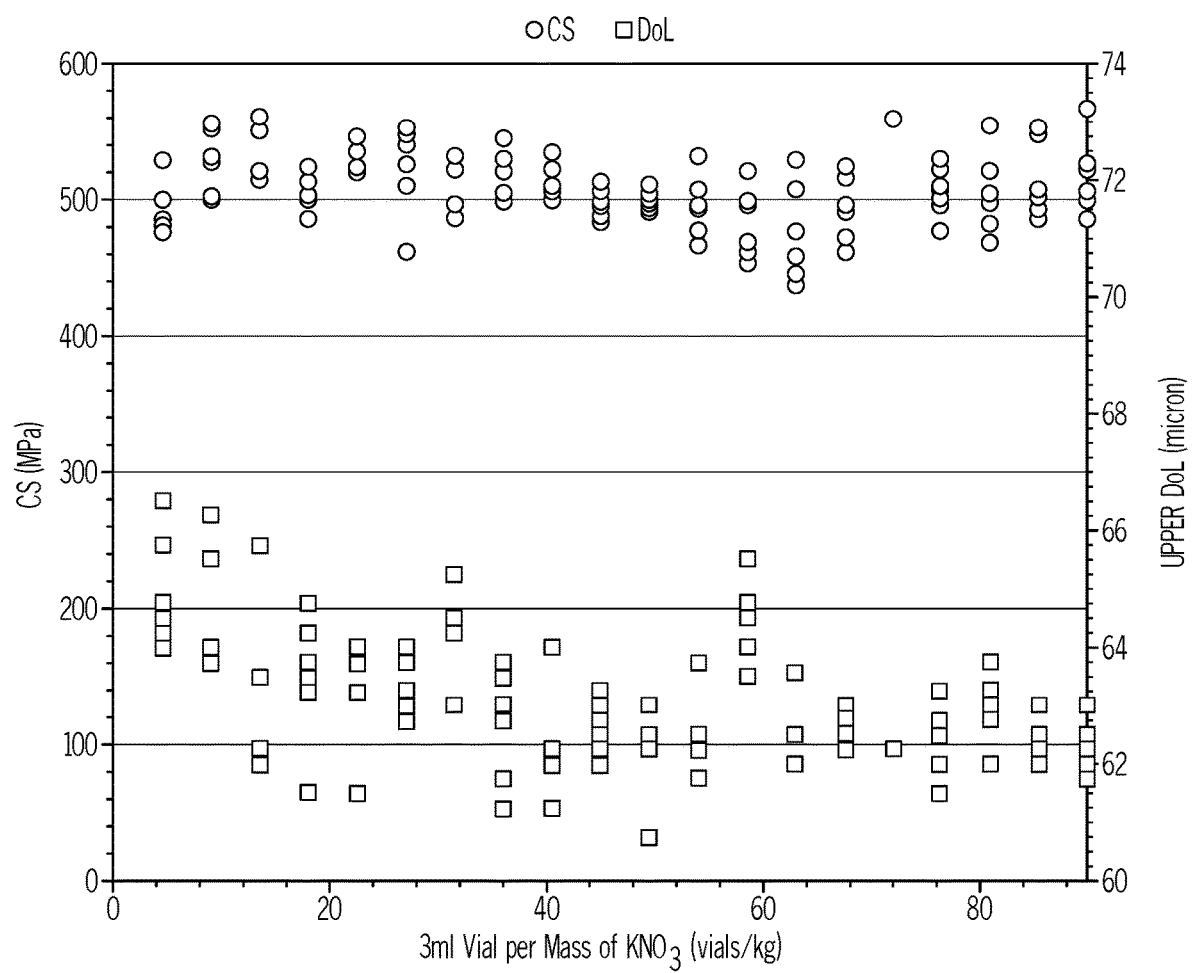
FIG. 6B graphically plots surface compressive stress (MPa; left y-axis) and depth of compression (μm; right y-axis) as a function of the number of glass articles strengthened (vials per kilogram of alkali metal salt; x-axis) for a salt bath system for strengthening glass articles, according to one or more embodiments shown and described herein.

As depicted in FIGS. 6A and 6B, the compressive stresses and depths of compression of the glass vials remained relatively constant over a period of 30 days of salt bath usage, wherein over 85 glass vials were subjected to the ion exchange process. While the depths of compression did decrease slightly, the compressive stresses achieved after 25 days were nearly identical to those achieved on the first day. This further affirms a regeneration medium including silicic acid may effectively neutralize a molten salt, even when confined to a single area of the molten salt.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A salt bath system for strengthening glass articles, the salt bath system comprising:
   a salt bath tank defining a first interior volume enclosed by at least one sidewall;
   a salt bath positioned within the first interior volume, the salt bath comprising an alkali metal salt;
   a containment device positioned within the first interior volume, wherein the containment device defines a second interior volume enclosed by at least one sidewall;
   a regeneration medium positioned within the second interior volume, the regeneration medium comprising a plurality of particles comprising an average particle size; and
   a circulation device positioned to introduce the salt bath into an inlet of the containment device whereby the circulation device is operable to circulate the salt bath through the containment device, wherein:
   the inlet of the containment device is enclosed by a sieve comprising openings having effective diameters less than or equal to 15% of the average particle size of the regeneration media;
   an outlet of the containment device is enclosed by a sieve comprising openings having effective diameters less than or equal to 15% of the average particle size of the regeneration media; or
   both inlet of the containment device and the outlet of the containment device are enclosed by sieves comprising openings having effective diameters less than or equal to 15% of the average particle size of the regeneration media.

2. The salt bath system of claim 1, wherein the regeneration medium comprises silicic acid aggregates, an alkali metal phosphate salt, a porous metal oxide, or combinations thereof.

3. The salt bath system of claim 1, wherein the average particle size of the regeneration medium is from 5 μm to 5,000 μm.

4. The salt bath system of claim 1, wherein greater than or equal to 90% of the regeneration medium have a particle size greater than 5 μm.

5. The salt bath system of claim 1, wherein the regeneration medium comprises grains, rings, saddles, spheres, engineered monoliths, honeycombs, fibers, felts, active layers coated on or impregnated in an inert carrier, or combinations of these.

6. The salt bath system of claim 1, wherein the salt bath positioned within the first interior volume is substantially free of the regeneration material.

7. The salt bath system of claim 1, wherein the circulation device comprises an impeller, a pump, a gas injection system, or combinations thereof.

8. The salt bath system of claim 1, wherein the circulation device is operable to circulate the salt bath through the containment device at a rate of from 0.001 vol/hr to 10 vol/hr.

9. The salt bath system of claim 1, wherein the second interior volume comprises a first regeneration zone and a second regeneration zone positioned downstream of the first regeneration zone.

10. The salt bath system of claim 9, wherein:
    the first regeneration zone comprises a first regeneration medium; and
    the second regeneration zone comprises a second regeneration medium different than the first regeneration medium.

11. The salt bath system of claim 10, wherein the containment device comprises a sieve positioned between the first regeneration zone and the second regeneration zone, wherein the sieve comprises openings having diameters less than the average particle size of at least one of the first regeneration medium and the second regeneration medium.

* * * * *